(12) United States Patent
Koyama et al.

(10) Patent No.: US 7,803,496 B2
(45) Date of Patent: Sep. 28, 2010

(54) FUEL CELL, FUEL CELL POWER SOURCE SYSTEM AND ELECTRONIC DEVICES USING THE SAME

(75) Inventors: Toru Koyama, Hitachi (JP); Osamu Kubota, Hitachi (JP); Hiroshi Sasaki, Mito (JP); Kenichi Souma, Mito (JP)

(73) Assignee: Hitachi, Ltd., Tokyo (JP)

( * ) Notice: Subject to any disclaimer, the term of this patent is extended or adjusted under 35 U.S.C. 154(b) by 1171 days.

(21) Appl. No.: 11/356,101

(22) Filed: Feb. 17, 2006

(65) Prior Publication Data
US 2007/0037040 A1    Feb. 15, 2007

(30) Foreign Application Priority Data
Aug. 9, 2005    (JP) .............................. 2005-230587

(51) Int. Cl.
 H01M 8/02    (2006.01)
 H01M 8/04    (2006.01)
 H01M 4/86    (2006.01)
(52) U.S. Cl. .................. 429/513; 429/506; 429/514; 429/523
(58) Field of Classification Search .................. 429/30, 429/34, 44, 38, 469, 506, 508
See application file for complete search history.

(56) References Cited

U.S. PATENT DOCUMENTS

| 6,291,093 B1 * | 9/2001 | Kindler et al. ................. 429/34 |
| 6,833,709 B2 * | 12/2004 | Xie ............................. 324/434 |
| 2003/0022056 A1 * | 1/2003 | Mercuri et al. ................ 429/44 |
| 2003/0211380 A1 * | 11/2003 | Hiroi et al. .................... 429/44 |

(Continued)

FOREIGN PATENT DOCUMENTS

JP    6-275284    9/1994

(Continued)

OTHER PUBLICATIONS

Machine Translation of JP 07142091 A, Nose et al., Jun. 1995.*

(Continued)

*Primary Examiner*—Jonathan Crepeau
*Assistant Examiner*—Kenneth Douyette
(74) *Attorney, Agent, or Firm*—Antonelli, Terry, Stout & Kraus, LLP.

(57) ABSTRACT

Provided is a fuel cell having a membrane electrode assembly for generating power by oxidizing fuel at an anode electrode and reducing oxygen at a cathode electrode, an anode diffusion layer for allowing fuel to pass therethrough to the outside of the anode electrode of the membrane electrode assembly and transferring electrons generated by the oxidation, a cathode diffusion layer for removing water thus generated and transferring electrons to be used for the reduction to the outside of the cathode electrode, an anode current collector and anode endplate for transferring electrons generated by the oxidation to the outside of the anode diffusion layer, and a cathode current collector and a cathode endplate for transferring electrons to be used for the reduction to the outside of the cathode diffusion layer. The anode endplate or anode current collecting layer is hydrophilic or the end plate on the anode side has a constitution promoting discharge of a gas generated by the reaction.

15 Claims, 8 Drawing Sheets

U.S. PATENT DOCUMENTS

| | | | |
|---|---|---|---|
| 2003/0215679 A1* | 11/2003 | Reinke et al. | 429/13 |
| 2004/0247992 A1 | 12/2004 | Kabumoto et al. | |
| 2005/0031926 A1* | 2/2005 | Sugimasa et al. | 429/30 |
| 2005/0282047 A1 | 12/2005 | Kimura et al. | |

FOREIGN PATENT DOCUMENTS

| | | |
|---|---|---|
| JP | 07142091 A * | 6/1995 |
| JP | 2003-7308 | 1/2003 |
| JP | 2003-68325 | 3/2003 |
| JP | 2004-039307 | 2/2004 |
| JP | 2004-140001 | 5/2004 |
| JP | 2004-152491 | 5/2004 |
| JP | 2004-522257 | 7/2004 |
| JP | 2004-342489 | 12/2004 |
| JP | 2005-200304 | 7/2005 |
| WO | WO 02/41433 A1 | 5/2002 |

OTHER PUBLICATIONS

U.S. Appl. No. 10/920,312, filed Aug. 18, 2004.
JP Office Action of Appln. No. 2005-230587 dated Mar. 22, 2010 with partial translation.

* cited by examiner

FIG. 6
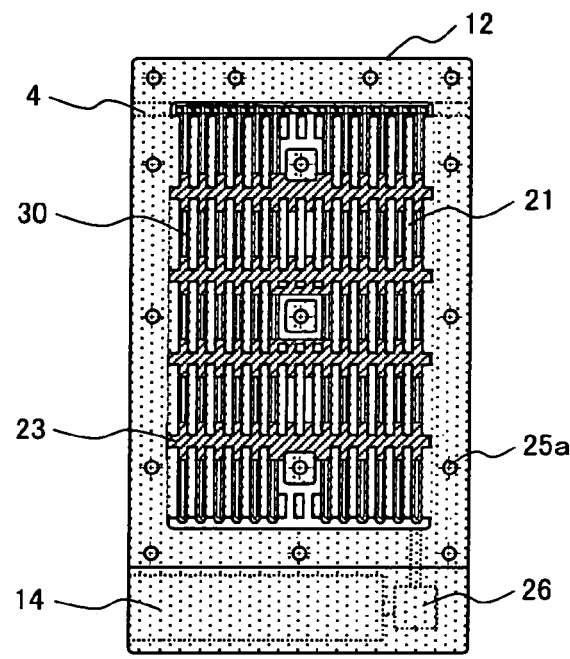
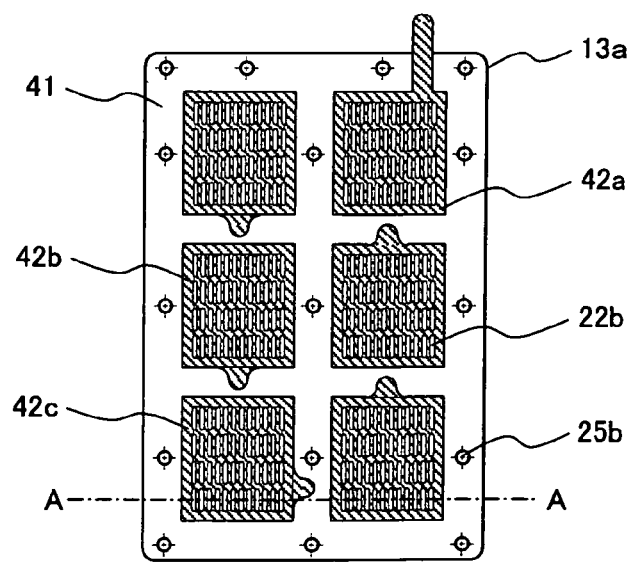
FIG. 7A
FIG. 7B

FUEL CELL, FUEL CELL POWER SOURCE SYSTEM AND ELECTRONIC DEVICES USING THE SAME

CLAIM OF PRIORITY

This application claims priority from Japanese application serial No. 2005-230587, filed on Aug. 9, 2005, the content of which is hereby incorporated into this application.

FIELD OF THE INVENTION

The present invention relates to a fuel cell power source system composed of an anode, an electrolyte membrane, a cathode and a diffusion layer and carries out oxidation of fuel at the anode and reduction of oxygen at the cathode, particularly to a small-sized mobile fuel cell power source system using liquid fuel such as methanol, dimethyl ether or ethylene glycol and mobile electric or electronic devices using the system.

BACKGROUND OF THE INVENTION

With the recent development of electronic technologies, cellular phones, laptop personal computers, digital cameras, audio-visual equipment, personal digital assistants and the like have become compact, and have spread widely as mobile electronic devices. Such mobile electronic devices are conventionally driven by a secondary battery. The successive appearance of new secondary batteries, that is, a seal lead battery, Ni/Cd battery, Ni/hydrogen battery and Li ion battery in the order of mention and technologies for size/weight reduction and attaining high energy density have supported the development of them. In any of these secondary batteries, a battery activating substance and a battery structure permitting a high capacity have been developed in order to heighten the energy density. Efforts have been made to prolong the serviceable time of the secondary battery per charging. These secondary batteries however have to be charged after consumption of a predetermined volume of power, and they therefore require charging equipment and a relatively long charging time. Thus, many problems have still remained in continuous operation of mobile electronic devices for long hours. Mobile electronic devices tend to require a power source having a higher output power density and a higher energy density to meet an increasing information amount and increasing processing speed in future. There is therefore an increasing demand for a small-sized power generator (micro power generator) which does not need charging.

A fuel cell power source system is considered as a system capable of meeting such a demand. A fuel cell directly converts chemical energy of fuel to electrical energy through electrochemical reaction. Accordingly, there is a high possibility of this system being realized as a small-sized power generating device, because it does not need a power output portion such as power generator using an internal combustion engine such as ordinarily employed engine power generator. In addition, a fuel cell enables continuous power generation only by replacing fuel or refilling fuel. It is not necessary to interrupt the operation of a mobile electronic device when its battery such as a secondary battery is charged. Under such a demand, a polymer electrolyte fuel cell (PEFC) using a perfluorocarbon sulfonic acid resin electrolyte membrane and carrying out oxidation of a hydrogen gas at an anode and reduction of oxygen at a cathode is under development. When it is used as a power source of a mobile electronic device, the volume of a fuel tank must be increased because of a low volumetric energy density of a hydrogen gas as fuel. This cell is therefore unsuited for size reduction.

Compared with a gas, liquid fuel is advantageous as fuel for fuel cell of small-sized devices because its density is higher than that of a gas. A fuel cell using liquid fuel such as methanol, ethanol, propanol, dimethyl ether or ethylene glycol is considered promising as a power source for small-sized devices which can be operated for long hours.

By using a direct methanol fuel cell (which will hereinafter be abbreviated as "DMFC") which is a standard one as an example of a fuel cell power source using liquid fuel, the principle of a DMFC power source will next be described. The DMFC is composed of a cell, a fuel container, a fuel supply apparatus and air or an air supply apparatus. The cell is obtained by connecting, in series or if necessary in parallel to each other, unit cells having a porous anode electrode and a cathode electrode on respective sides of a solid electrolyte, an anode diffusion layer and a cathode diffusion layer disposed outside of these electrodes, and an anode endplate and a cathode endplate disposed on the outside of the anode diffusion layer and cathode diffusion layer, respectively and having a current collecting function. When methanol is used as fuel, methanol passing through the anode diffusion layer and coming in contact with the catalyst at the anode electrode reacts with water in accordance with the reaction formula (1) and dissociates into carbon dioxide, hydrogen ions and electrons.

$$CH_3OH+H_2O \rightarrow CO_2+6H^++6e^- \qquad (1)$$

The hydrogen ions reach the cathode electrode, passing through an electrolyte in the anode electrode and a solid electrolyte membrane between the anode electrode and cathode electrode. Oxygen fed to the cathode electrode and electrons entering from the outside circuit are brought into contact with a cathode catalyst, whereby reaction occurs in accordance with the following reaction formula (2) to generate water.

$$6H^++3/2O_2+6e^- \rightarrow 3H_2O \qquad (2)$$

Electrons emitted from methanol pass through a catalyst carrier in the anode electrode and the anode diffusion layer, collected in the anode current collector and introduced into the outside circuit. From the outside circuit, they flow into the cathode electrode, passing through the cathode current collector and cathode diffusion layer. As a result, electrons move from the anode electrode toward the cathode electrode in the outside circuit, leading to power generation.

In the total chemical reaction occurring upon power generation, methanol is oxidized by oxygen and produces a carbon dioxide gas and water as shown below in the reaction formula (3). Its reaction formula is therefore formally similar to that of flaming combustion of methanol. In a fuel cell using an aqueous methanol solution as fuel, power generation occurs as direct conversion of chemical energy of methanol to electrical energy in the above-described electrochemical reaction.

$$CH_3OH+3/2O_2 \rightarrow CO_2+3H_2O \qquad (3)$$

In the conventional DMFC, carbon dioxide generated in the reaction formula (1) and carbon monoxide which is an intermediate product accumulate in the anode electrode, anode diffusion layer or anode endplate and disturb the supply of fuel, which deteriorates a power generation efficiency, decreases an effective surface area of a catalyst to reduce an output voltage, and increases an internal pressure to disturb supply of fuel, resulting in a reduction in the output voltage. Smooth discharge of a gas adsorbed as a foam to the electrode surface, diffusion layer or anode endplate to prevent an increase in the internal pressure is therefore indispensable for stable supply of fuel and attaining a predetermined output voltage. In particular, in a passive type DMFC not using a forced mechanism such as pump for fuel supply, smooth discharge of a gas such as carbon dioxide generated at an anode and prevention of an increase in internal pressure are necessary and indispensable.

There have been proposed methods of releasing a gas such as carbon dioxide remaining at an anode electrode, for example, by adding a defoaming agent to an aqueous methanol solution, incorporating a defoaming agent in an electrode, or, as described in Japanese Patent Unexamined Publication No. 2004-039307, incorporating a trapping agent of carbonate ions in an anode electrode or fuel supply portion. In the method of adding a defoaming agent to an aqueous methanol solution, however, the amount of the defoaming agent increases owing to accumulation of it with the passage of time, which poisons an anode catalyst, thereby deteriorating the catalyst capacity of the anode electrode. In the method of incorporating a defoaming agent in an electrode, the defoaming agent poisons an anode catalyst and lowers the catalyst capacity, which leads to drawbacks such as increase in the internal pressure and reduction in the fuel supply capacity. Another method proposed is to release carbon dioxide remaining at an anode electrode by oscillation or forced circulation of fuel by a pump. Such a method is not satisfactory when the recent tendency to size/weight reduction is considered, because it consumes power for oscillation or fuel circulation.

There is accordingly an eager demand for the establishment of a method for releasing a carbon dioxide gas which method is effective for long hours, in order to prevent an increase in internal pressure or reduction in the fuel supply capacity which will otherwise occur by a gas adsorbed as a foam to the anode diffusion layer or anode endplate.

An object of the present invention is, in order to prevent an output reduction of a fuel cell which will otherwise occur owing to the disturbance of fuel supply by the accumulation, in an anode diffusion layer or anode endplate, of a gas such as carbon dioxide produced by the reaction between methanol and water at an anode electrode or carbon monoxide which is an intermediate product of the carbon dioxide, to smoothly discharge the gas adsorbed in the form of foam to the anode diffusion layer or anode endplate.

SUMMARY OF THE INVENTION

In the present invention, there is thus provided a fuel cell which comprises a membrane electrode assembly for generating power by oxidizing fuel at an anode electrode and reducing oxygen at a cathode electrode, an anode diffusion layer for causing penetration therethrough of the fuel to the outside of the anode electrode of the membrane electrode assembly and transferring electrons generated by the oxidation, a cathode diffusion layer for removing water produced and transferring electrons to be used for the reduction to the outside of the cathode electrode, an anode current collector and anode endplate for transferring electrons generated by the oxidation to the outside of the anode diffusion layer, and a cathode current collector and cathode endplate for transferring electrons to be used for the reduction to the outside of the cathode diffusion layer, wherein at least the anode endplate or anode diffusion layer is hydrophilic or anode endplate has a structure promoting discharge of a gas generated by reaction.

According to the present invention, a carbon dioxide gas generated by the reaction of a cell is discharged efficiently so that output of the cell can be maintained for long hours without lowering it.

BRIEF DESCRIPTION OF THE DRAWINGS

FIG. 3 is a schematic view for explaining the shape of a slit formed in an anode endplate or the like;

FIG. 6 is a plan view illustrating one example of a fuel chamber/exhaust gas module integrated structure according to the present invention;

FIG. 7A and FIG. 7B are a plan view and a cross-sectional view illustrating one example of an anode endplate structure according to the present invention;

DETAILED DESCRIPTION OF THE PREFERRED EMBODIMENTS

The present inventors investigated a method of preventing the adsorption of a gas such as carbon dioxide or carbon monoxide generated at an anode to an anode diffusion layer or endplate in details and as a result, they completed the present invention. The present invention makes it possible to provide a fuel cell capable of preventing adsorption of a gas such as carbon dioxide or carbon monoxide generated at an anode to an anode diffusion layer or anode endplate, supplying a fuel promptly and achieving a high output stably; and a manufacturing method of the fuel cell.

A first method to attain the above-described object is to maintain a hydrophilic property of a material of the anode diffusion layer, which is ordinarily subjected to water repellent treatment, in order to discharge a gas from the anode diffusion layer promptly, prevent an increase in an internal pressure and obtain a high output stably for a prolonged period of time.

The term "has a hydrophilic property" as used herein means that the material has a contact angle with water not greater than 700. Contact angles not greater than 500 are highly effective, with contact angles not greater than 200 being more preferred. At contact angles less than 200 meaning ultra-high hydrophilic property, the material exhibits the best performance.

A second method is to subject the anode diffusion layer to hydrophilization treatment in order to discharge a gas from the anode diffusion layer promptly, prevent an increase in an internal pressure and obtain a high output stably for a prolonged period of time.

Figure 3:
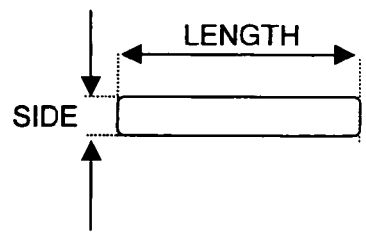

A third method is to adjust a short side/long side ratio of each slit of the anode endplate and current collector, which is illustrated in FIG. 3, to from 0.2 to 0.95 in order to discharge a gas from the anode diffusion layer promptly, prevent an increase in an internal pressure and obtain a high output stably for a prolonged period of time.

A fourth method is to incline the anode endplate and current collector so that the slit width thereof is widened from the anode diffusion layer side toward the fuel chamber side in order to discharge a gas from the anode diffusion layer promptly, prevent an increase in an internal pressure and obtain a high output stably for a prolonged period of time.

A fifth method is to roughen the surface of the anode endplate physically using sandblast or the like in order to discharge a gas from the anode diffusion layer promptly, prevent an increase in an internal pressure and obtain a high output stably for a prolonged period of time.

A sixth method is to hydrophilize the anode endplate in order to discharge a gas from the anode diffusion layer promptly, prevent an increase in an internal pressure and obtain a high output stably for a prolonged period of time. Use of some of the first to sixth methods in combination is more preferred.

Based on them, preferred embodiments of the present invention will next be described. A first embodiment is a fuel cell which comprises a membrane electrode assembly for generating power by oxidizing methanol fuel at an anode electrode and reducing oxygen in the air at a cathode electrode, an anode diffusion layer which is placed on a side opposite to the cathode electrode of the membrane electrode assembly, causes the fuel to pass through the diffusion layer and transfers electrons generated by the oxidation, a cathode diffusion layer for removing water produced and transferring electrons to be used for the reduction to the outside of the cathode electrode, an anode current collector which is brought into contact with the anode diffusion layer directly or via another member and transfers electrons generated by the oxidation, an anode endplate brought into electrical contact with the anode current collector, a cathode current collector which is brought into contact with the cathode diffusion layer directly or via another member and transfers electrons to be used for the reduction, and a cathode endplate brought into electrical contact with the cathode current collector, wherein the anode endplate is hydrophilic and the fuel cell has a structure permitting contact with the air on the side of the cathode current collector. This fuel cell is a passive type and does not need any auxiliary apparatus for air circulation or fuel circulation.

A second embodiment is a fuel cell which comprises a membrane electrode assembly having an electrolyte membrane and electrode, a cathode diffusion layer and anode diffusion layer disposed on the respective sides of the membrane electrode assembly, a cathode current collector and anode current collector disposed outside of the diffusion layers, and end plates encompassing therewith the cathode current collector and anode current collector and having slits; wherein the cathode diffusion layer is brought into contact with air through the slits on the side of the cathode current collector, methanol fuel is brought into contact with the anode diffusion layer through the slits on the side of the anode current collector, and a region of the anode endplate encompassing therewith the anode current collector, which endplate is brought into contact with the methanol fuel, is hydrophilic. This fuel cell is also a passive type.

In the embodiment of the present invention, (1) either or both of the cathode endplate and anode diffusion layer may be hydrophilized. Moreover, it embraces (2) a fuel cell wherein the slits of the anode current collector each has a short side/long side ratio of from 0.5 to 0.92 and (3) a fuel cell wherein the anode current collector is inclined so that the slits become wider from the electrode side toward the fuel chamber side. These (1) to (3) may be used either singly or in combination with another method.

The embodiments of the present invention will hereinafter be described more specifically. When any of the embodiments of the present invention is applied to a fuel cell, an increase in an internal pressure can be prevented, fuel can be supplied smoothly and output of a fuel cell can be stabilized by preventing adsorption of a gas such as carbon dioxide or carbon monoxide generated at an anode to an anode diffusion layer or anode endplate or removing the gas adsorbed thereto in the form of foam.

As the cathode diffusion layer and anode diffusion layer, a water-repellent carbon cloth or carbon paper is conventionally used. In the first embodiment of the present invention, a water repellent function conventionally given to the anode diffusion layer is removed therefrom. This facilitates separation of a gas such as carbon dioxide or carbon monoxide from the anode diffusion layer, prevents an increase in the internal pressure which will otherwise occur by the gas, enables prompt fuel supply, and stabilizes the output of a fuel cell. For elimination of the water repellent function from the anode diffusion layer, a carbon cloth or carbon paper not subjected to water repellent treatment is used as the anode diffusion layer instead of the conventional water-repellent carbon cloth or carbon paper. Examples of the carbon cloth or carbon paper not subjected to water repellent treatment include "Carbon Paper TGP-H-030, TGP-H-060, TGP-H-090 and TGP-H-120" (each, trade name; product of Toray) and carbon cloth manufactured by Mitsubishi Rayon. Use of a diffusion layer obtained by exposing a water repellent carbon cloth or carbon paper to oxygen plasma to remove therefrom the water repellent is also effective. Single use of the first embodiment is insufficient and use of it with any of the second to sixth embodiments in combination is preferred.

In the second embodiment, the anode diffusion layer is hydrophilized. No particular limitation is imposed on the hydrophilization method insofar as it can impart the anode diffusion layer with a hydrophilic property. Examples of the recommendable method include (1) treatment of the anode diffusion layer with an oxidizing agent selected from hydrogen peroxide, sodium hypochlorite, potassium permanganate, hydrochloric acid, nitric acid, phosphoric acid, sulfuric acid, hydrofluoric acid, acetic acid and ozone to introduce a hydrophilic group such as hydroxyl, sulfonic acid, carboxyl, phosphoric acid, sulfate ester, carbonyl or amino group into carbon, (2) activating treatment such as electrolytic oxidation (anodization) and steam oxidation and (3) addition of a hydrophilization agent.

Specific methods of them include (1) addition of a hydroxyl group or carbonyl group by treating carbon paper or carbon cloth used as the anode diffusion layer with oxygen plasma, addition of a sulfonic acid group or hydroxyl group to the surface of carbon of carbon paper or carbon cloth used as the anode diffusion layer by treating it with fuming sulfuric acid, and addition of sulfonic acid group to the surface of carbon of carbon paper or carbon cloth used as the anode diffusion layer by sulfonation treatment, (2) activation treatment of carbon paper or carbon cloth used as the anode diffusion layer by positive vapor oxidation, and (3) treatment of carbon paper or carbon cloth used as the anode diffusion layer with a hydrophilizing agent and treatment of carbon paper or carbon cloth used as the anode diffusion layer with a hydrophilic surfactant.

In the third embodiment, the $CO_2$ release holes of the anode endplate are inclined to widen them from the side of the anode diffusion layer toward the side of the fuel chamber. No particular limitation is imposed on the inclination angle insofar as a gas such as carbon dioxide or carbon monoxide is not trapped by the anode endplate.

In the third embodiment, an opening ratio of the anode endplate is adjusted to from 30 to 60%, preferably from 35 to 45%. At lower opening ratios, a gas such as carbon dioxide or carbon monoxide cannot be removed easily and fuel supply tends to become unstable. Higher opening ratios, on the other hand, decrease the area of a collector plate, increase electrical resistance and tend to cause a reduction in output.

In the fourth embodiment, the surface of the anode endplate is roughened physically, more specifically, roughened by polishing with sandblast or sand paper.

In the fifth embodiment, the anode endplate is hydrophilized. No particular limitation is imposed on the hydrophilization method insofar as it can decrease the contact angle with water to 500 or less, preferably 40° or less. Examples of the hydrophilization method of the anode endplate include (1) exposure to electron beams, (2) exposure to oxygen plasma, (3) corona discharge treatment, (4) ozone UV treatment (5) addition of a sulfurous acid gas or sulfuric acid to introduce a sulfonic acid group, and (6) treatment with a hydrophilizing agent. Hydrophilization treatment by (1) exposure to electron beams, (2) exposure to oxygen plasma, (3) corona discharge treatment or (4) ozone UV treatment is very effective just after treatment because the anode end plate does not trap a gas such carbon dioxide or carbon monoxide, but when the anode end plate is incorporated in a fuel cell, its effect gradually decreases during use.

In particular, (6) treatment with a hydrophilizing agent is effective. It is preferred to improve the wetness of the surface of the anode endplate in advance by exposing it to UV rays or oxygen plasma to the anode endplate, or allowing it to stand in an oxygen plasma atmosphere or ozone atmosphere prior to the treatment with a hydrophilizing agent. A high pressure mercury lamp or ultra high pressure mercury lamp can be used for exposing it to UV rays, but a lamp such as deep UV lamp or low pressure mercury lamp which can easily produces ozone by emitting a UV light at 254 nm or 185 nm is effective. When the anode plate is flat, exposure to UV light or oxygen plasma is effective, while when the anode plate has a surface with many irregularities, it is preferably allowed to stand in an oxygen plasma or ozone atmosphere. In the above-described treatment, when the anode endplate is made of an acrylic resin, hydrophilization conditions must be set so that the contact angle with water be 50° or less after the treatment, showing a decrease from that of about 95° before the treatment.

When the anode endplate is made of polycarbonate or PMMA, the conditions are also set to decrease the contact angle after the treatment to 50 degree or less. When it is made of a hydrocarbon resin such as polyethylene or polypropylene, the conditions must be set severer compared with the case of the acrylic resin to decrease the contact angle with water, which is from about 80 to 90 before treatment, to 50 degree or less after the treatment. By heating the anode endplate during exposure to UV rays, the hardness of a hydrophilic film formed by the application of a hydrophilic coating and heat curing can be improved drastically.

The heating temperature may be set near the thermal deformation temperature (specifically, thermal deformation temperature ±20° C.) of the anode endplate. For example, when the anode endplate has a thermal deformation temperature of 100° C., the heating temperature is set at from 80 to 120° C. When it has a thermal deformation temperature of 110° C., the heating temperature is set at from 90 to 130° C. By the hydrophilization as described above, a hydrophilic film, which has only a pencil harness of 2B or less when not subjected to hydrophilization, can have a pencil hardness of several H. The term "thermal deformation temperature" as used herein is defined as "temperature at which warpage of a plate having a predetermine size (height×width×thickness=100 mm×100 mm×5 mm) occurs by heating. The heating time is for 30 minutes. Even if the heating temperature is higher than the thermal deformation temperature, such a short heating time enables hydrophilization without causing deformation.

A hydrophilic coating is then applied. Ordinarily employed application methods such as dip coating, spin coating, spray coating and bar coating can be employed for it.

Heating is then conducted. The heating temperature must be set at a temperature lower than the thermal deformation temperature of the anode endplate. During curing, the film surface is heated smoothly at a curing temperature which facilitates the formation of pores in the hydrophilic film.

(2) Hydrophilic Coating

The hydrophilic coating is composed of a hydrophilic material, a support material for supporting the hydrophilic material therewith, and a solvent.

(a) Hydrophilic Material

Examples of the hydrophilic material include organic polymer materials such as polyethylene glycol and polyvinyl alcohol, and inorganic materials such as hydrophilic alumina particles and hydrophilic silica particles. Of these, inorganic materials such as hydrophilic alumina particles and hydrophilic silica particles are excellent because they can keep hydrophilicity long without causing elution even immersed in water for a long period of time (these inorganic materials become corresponding inorganic oxides). These inorganic fine particles often exist as a water dispersion and in this case, the coating containing them has an increased water content. When the coating is applied to the surface of a base material and dried, an increased water content leads to the possibility of the coating being repelled on the surface of the base material. This owes to a surface tension of water, 72 mN/m, greater than that of an ordinarily employed organic solvent. As the solvent for dispersing the hydrophilic material therein, that having a surface tension of from 20 to 30 mN/m and smaller than that of water, for example alcohol orethyl methyl ketone, is excellent from the viewpoint of a film forming property. As the hydrophilic material to be used in the present invention, hydrophilic silica particles are especially preferred, because they can be dispersed in an organic solvent such as alcohol or ethyl methyl ketone. Specific examples include "Colloidal silica IPA-ST" and "MEK-ST" (trade name) each product of Nissan Chemical.

(b) Support Material

Examples of the support material include organic polymer materials such as polyethylene glycol and polyvinyl alcohol, organic materials such as polyacrylamide which are polymerized into a support material by heating, and materials such as silica sol which become an inorganic support material by heating. Of these, materials such as acrylamide and silica sol are superior because they are free from elution even immersed in water for long hours and therefore, they can maintain a hydrophilic property for a long period of time. When the suitability with the hydrophilic material which is supported by the support material is taken into consideration, silica sol is especially suited for inorganic materials.

The term "silica sol" means that obtained by heating an alkoxysilane in water acidified with dilute hydrochloric acid, dilute nitric acid or dilute phosphoric acid or a water-alcohol mixture to cause self-polymerization and having a molecular weight of several thousands. Examples of the alkoxysilane include methyltrimethoxysilane, ethyltrimethoxysilane, butyltrimethoxysilane, tetramethoxysilane and tetraethoxysilane. Instead of an alkoxysilane, an alkoxytitanium may be used if its liquid property or solvent does not disturb the preparation of the above-described silica sol. Examples of the alkoxytitanium include tetra-i-propyl titanate, tetra-n-butyl titanate, tetrastearyl titanate, triethanolamine titanate, titanium acetyl acetonate, titanium ethylacetoacetate, titanium lactate, and tetraoctylene glycol titanate. Compounds obtained by polymerizing several molecules of the exemplified compound can also be used.

Even use of an amino-containing alkoxysilane instead of the above-described silica sol can also attain a similar supporting performance to that of the silica sol. In addition, when the amino-containing alkoxysilane is exposed to an acidic gas atmosphere, the amino group is converted into an ammonium salt structure, resulting in a further improvement in the hydrophilic property of the film. Examples of such a material include N-(2-aminoethyl)-3-aminopropylmethyldimethoxysilane (for example "Sila-Ace S310", trade name; product of Chisso Corporation), 3-aminopropyltriethoxysilane ("Sila-Ace S330", trade name; product of Chisso Corporation), and 3-aminopropyltrimethoxysilane ("Sila-Ace S360", trade name; product of Chisso Corporation). "Sila-Ace Oligomer MS3201" or MS3301" (each, trade name; product of Chisso Corporation) which are compounds obtained by polymerizing several molecules of "S320" or "S330" can also be employed.

(c) Solvent

Solvents having good suitability (dispersibility, compatibility) with the hydrophilic material or support material and vaporizing easily during heat curing are preferred. In order to form voids in the hydrophilic film, solvents preferably have a boiling point lower than the heat curing temperature. Alcohol solvents are preferred because they can effectively disperse therein hydrophilic alumina particles or hydrophilic silica particles which are desirable materials having high durability. Alcohol solvents are also preferred because they have high compatibility with silica sol which is preferred as the support material. The acrylic resin and polycarbonate resin have a heat curing temperature of 100° C. or less and 120° C. or less, respectively so that when the heat resistance of the resin is taken into consideration, alcohol solvents usable for them are, for example, methanol, ethanol, n-propanol and isopropanol have a boiling point of 100° C. or less. Use of a solvent such as n-butanol having a higher boiling point than that of n-propanol causes an excessive increase in a porosity, which tends to lower the hardness. In order to adjust the pencil hardness of a hydrophilic film to 2H or greater, a porosity is preferably adjusted to fall within a range of from 2 to 14% by volume of the hydrophilic film.

(d) Lubricating Material

There is a method of improving the surface lubrication, thereby improving friction resistance. Addition of a silicone lubricating material in an amount of from 0.01 to 0.5 wt. % based on the solid content improves the lubrication, thereby improving the friction resistance. Amounts of 2% or greater based on the solid content however tend to deteriorate the hydrophilic property on the surface. A silicone lubricating material is preferably soluble in a solvent of a coating used for the formation of a hydrophilic film, but a lubricating material which is insoluble but can be dispersed almost uniformly for a predetermined time by stirring can also be used. Specific examples include "BYK-370" and "BYK-310" (each trade name; product of BYK-Chemie).

The membrane electrode assembly (MEA) to be used in the present invention will next be described. No particular limitation is imposed on a solid polymer electrolyte membrane used for MEA insofar as it has proton conductivity. Specific examples include fluorine series solid polymer electrolyte membranes typified by a polyperfluorosulfonic acid membrane which is known under the commodity name of "Nafion" (trade mark, product of Dupont), "Aciplex" (trademark; product of Asahi Kasei Kogyo) or "Flemion" (trade mark; product of Asahi Glass); partially fluorinated solid polymer electrolyte membranes such as sulfonic acid polystyrene-graft-ethylenetetrafluoroethylene copolymer (ETFE) membrane composed of a main chain prepared by the copolymerization of a fluorocarbon vinyl monomer and a hydrocarbon vinyl monomer and a hydrocarbon side chain having a sulfonic acid group, and a sulfonic acid type poly(trifluorostyrene)-graft-ETFE membrane obtained as a solid polymer electrolyte membrane by carrying out graft polymerization of a,β,β-trifluorostyrene to a membrane prepared by copolymerization of a fluorocarbon vinyl monomer and a hydrocarbon vinyl monomer and then introducing a sulfonic acid group into the resulting graft polymer; sulfonated engineering plastics electrolyte membranes such as sulfonated polyetheretherketone, sulfonated polyethersulfone, sulfonated acrylonitrile-butadiene-styrene polymer, sulfonated polysulfide and sulfonated polyphenylene; sulfolalkylated engineering plastics electrolyte membranes such as sulfoalkylated polyetheretherketone, sulfoalkylated polyethersulfone, sulfoalkylated polyetherethersulfone, sulfoalkylated polysulfone, sulfoalkylated polysulfide, sulfoalkylated polyphenylene, and sulfoalkylated polyetherethersulfone; and aromatic hydrocarbon solid polymer electrolyte membranes such as sulfoalkyletherified polyphenylene. Of these, aromatic hydrocarbon solid polymer electrolyte membranes are preferred from the viewpoint of methanol permeability. Especially, aromatic hydrocarbon solid polymer electrolyte membranes having an alkylenesulfonic acid group introduced therein are preferred from the viewpoints of methanol permeability, swelling property and durability.

Fuel cells which can be operated even in a higher-temperature region can be obtained by using a composite electrolyte membrane obtained by the micro-dispersion, in a heat resistant resin, of a proton conductive inorganic material such as tungsten oxide hydrate, zirconium oxide hydrate, tin oxide hydrate, silicotungstic acid, silicomolybdic acid, tungstophosphoric acid or molybdophosphoric acid. In the above-described acid electrolyte membrane in the form of a hydrate, owing to a difference in a swelling rate between drying time and wet time, the membrane changes its shape so that a membrane having a sufficient ion conductivity sometimes has insufficient mechanical strength. In such a case, fibers excellent in mechanical strength, durability and heat resistance are used in the form of a woven or nonwoven fabric as a core material and during preparation of an electrolyte membrane, these fibers are added as a filler to reinforce the membrane. This method is effective for heightening the reliability of the performance of a fuel cell. Also a membrane obtained by doping sulfuric acid, phosphoric acid, sulfonic acid or phosphonic acid into a polybenzimidazole in order to reduce the fuel permeability of an electrolyte membrane can be used.

The sulfonic acid equivalent of such a solid polymer electrolyte membrane is preferably from approximately 0.5 to 2.0 milliequivalent/g dry resin, more preferably from 0.7 to 1.6 milliequivalent/g dry resin. The sulfonic acid equivalent below the above-described range increases the ion conductivity resistance of the membrane, while that exceeding the above-described range results in high water-solubility. The sulfonic acid equivalents outside the above-described range are therefore not preferred.

Although no particular limitation is imposed on the thickness of the solid polymer electrolyte membrane, it is preferably from 10 to 200 µm, especially preferably from 30 to 100 µm. Thickness greater than 10 µm is preferred in order to impart the membrane with strength enough to endure the practical use, while thickness smaller than 200 µm is preferred in order to reduce the resistance of the membrane, that is, improve the power generation performance. When a solution casting method is employed, the film thickness can be controlled by the concentration of the solution or application thickness onto a substrate. When a membrane is formed from a molten state, the film thickness can be controlled by extending, at a predetermined ratio, a film having a predetermined thickness obtained by melt press or melt extrusion method.

When a solid polymer electrolyte membrane to be used in the present invention is prepared, an additive such as plasticizer, stabilizer or mold release agent which is ordinarily used for polymers may be added within a range not contrary to the object of the present invention.

An electrode to be used for the membrane electrode assembly (MEA) for a fuel cell is composed of a conductive material having fine particles of a catalyst metal supported thereon and it may contain a water repellent or binder as needed. Further, a layer composed of a conductive material having no catalyst supported thereon and a water repellant or a binder contained as needed may be formed outside of the catalyst layer. As the catalyst metal used for the electrode, any metal capable of promoting the oxidation reaction of hydrogen and the reductive reaction of oxygen can be used. Examples include platinum, gold, silver, palladium, iridium, rhodium, ruthenium, iron, cobalt, nickel, chromium, tungsten, manganese and vanadium, and alloys thereof.

Of these catalysts, platinum is used frequently. A particle size of the metal serving as a catalyst is usually from 10 to 300 Angstroms. It is advantageous to attach these catalysts to a carrier such as carbon, because it decreases their using amount and reduces a cost. The amount of the catalyst supported by a carrier after formation of the electrode is preferably from 0.01 to 10 mg/cm$^2$. No particular limitation is imposed on the thickness of the catalyst layer, it is preferably from 10 to 100 µm, especially preferably from 10 to 50 µm. The thickness is preferably 10 µm or greater in consideration of the durability, while it is preferably 50 µm or less in consideration of the efficiency of the catalyst. The anode catalyst layer is preferably thicker than the cathode catalyst layer because the reaction of an aqueous solution of fuel such as methanol in the chemical formula (I) is slow. The thickness of the anode catalyst layer is preferably from 10 to 200 µm, especially preferably from 50 to 150 µm. The thickness of the cathode catalyst layer is preferably from 1 to 50 µm, especially preferably from 5 to 20 µm. The anode catalyst layer and anode diffusion layer are preferably hydrophilized in order to improve wetness with the aqueous solution of fuel such as methanol. On the contrary, the cathode diffusion layer is preferably subjected to water repellent treatment in order to prevent retention of produced water.

As the conductive material having the catalyst supported thereon, any electron conductive material can be used. Examples include various metals and carbon materials. Examples of the carbon materials include furnace black, channel black, acetylene black, amorphous carbon, carbon nanotube, carbon nanohorn, active carbon and graphite. They may be used either singly or as a mixture. The carbon particles have a particle size of, for example, 0.01 µm or greater but not greater than 0.1 µm, preferably 0.02 µm or greater but not greater than 0.06 µm. As the repellant, fluorinated carbon, polytetrafluoroethylene or the like can be used.

As the binder, it is preferred, in view of adhesion, to use an electrode catalyst covering solution as described in the embodiment of the present invention as is, but another resin may be used. In the latter case, addition of a fluorine-containing resin having water repellency is preferred, with addition of the resin further having excellent heat resistance and oxidation resistance being more preferred. Examples include polytetrafluoroethylene, tetrafluoroethylene-perfluoroalkyl vinylether copolymer, and tetrafluoroethylene-hexafluoropropylene copolymer. The cathode electrode (carrier) is preferably subjected to water repellent treatment, while the anode electrode (carrier) is preferably subjected to no treatment or hydrophilization treatment.

No particular limitation is imposed on the process of joining an electrolyte membrane and an electrode which are used for a fuel cell and any known process can be employed. For example as a manufacturing process of MEA, a Pt catalyst powder supported by a conductive material such as carbon is mixed with a polytetrafluoroethylene suspension. The resulting mixture is applied to carbon paper, followed by heat treatment to form a catalyst layer. An electrolyte solution similar to the electrolyte membrane or a fluorine electrolyte is applied as binder to the catalyst layer, and the catalyst layer and the electrolyte membrane are hot pressed, whereby they are formed as an assembly. Additional examples of the MEA manufacturing process include a process of coating a Pt catalyst powder with an electrolyte solution similar to that of the membrane electrolyte assembly, a process of applying a catalyst paste to an electrolyte membrane by printing, spraying, slit spraying or inkjet, a process of electroless-depositing an electrode on an electrolyte membrane, a process of adsorbing platinum group metal complex ions to an electrolyte membrane, followed by reduction. Of them, a process of applying a catalyst paste to an electrolyte membrane by ink jet process does not produce much catalyst loss and is therefore excellent.

DMFC is obtained by stacking, via a cooling plate, a plurality of unit cells one after another, each having a fuel flow distribution panel and an oxidant flow distribution channel as current collectors equipped with channels for forming a fuel flow channel and an oxidant flow channel on the outside of the MEA formed as described above. The unit cells may be connected by, in addition to stacking, arranging them in parallel to each other. No particular limitation is imposed on the connecting method of the unit cells.

There is no particular limitation imposed on the fuel cell insofar as it is a direct type fuel cell using liquid fuel such as methanol, ethanol, dimethyl ether or ethylene glycol. The fuel cell can be roughly classified into two systems, a circulation system which supplies fuel to an anode by a pump and recycles the unused fuel and water by-produced at a cathode; and a passive system which supplies fuel by a cartridge or the like and supplies air at a cathode, depending on natural convection. The latter system is especially effective because the flow of the fuel is weaker than that of the circulation system.

Figure 1:
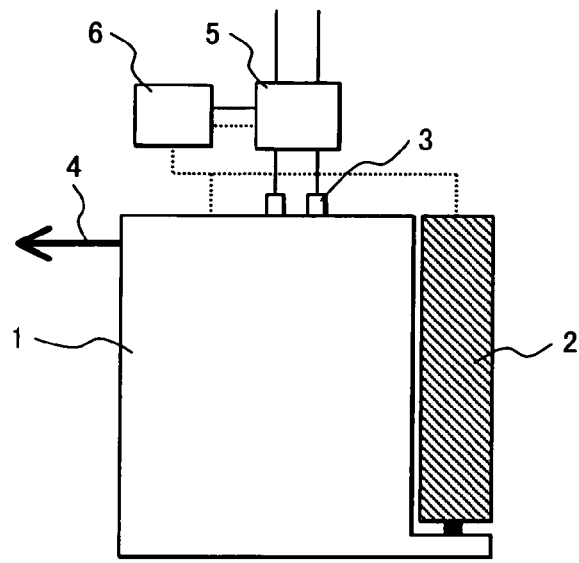
FIG. 1 is a schematic view illustrating a fuel cell power source system to which the present invention is applied.

One constitution example of such a passive power source system according to this Example is illustrated in FIG. 1. The power source system is composed of a fuel cell 1, a fuel cartridge tank 2, an output terminal 3 and an exhaust gas port 4. A carbon dioxide gas produced at an anode side passes through a fuel chamber 12 (FIGS. 12A and 12B) and discharged from the exhaust gas port 4. The fuel cartridge tank 2 adopts a system of sending fuel by making use of a pressure of a high-pressure liquefied gas, a high pressure gas or a spring. It supplies the fuel to the fuel chamber 12 as disclosed in FIG. 2 and at the same time, maintains the pressure of the liquid fuel in the fuel chamber higher than atmospheric pressure. When the fuel in the fuel chamber 12 is consumed during power generation, fuel in an amount equal to the consumption amount is supplied thereto from the fuel cartridge 2.

The battery output system supplies electric power to load equipment via a DC/DC converter 5. The power source system is equipped with a controller 6 which receives signals related to the fuel cell 1, the remaining amount of the fuel in the fuel cartridge tank 2 and the state during operation and termination of the DC/DC converter 5, controls the DC/DC converter 5 and is set to output a warning signal depending on the condition. If necessary, the controller 6 is also able to display operation conditions of the power source, such as battery voltage, output current, and battery temperature, on the load equipment, and if the remaining amount of the fuel in the fuel cartridge tank 2 becomes less than a prescribed level, or if the air diffusion amount is outside a predetermined range, the controller 6 stops supplying electric power from the DC/DC converter 5 to the load equipment and activates an audible warning signal, vocal warning, pilot lamp or character warning display.

Figure 2:
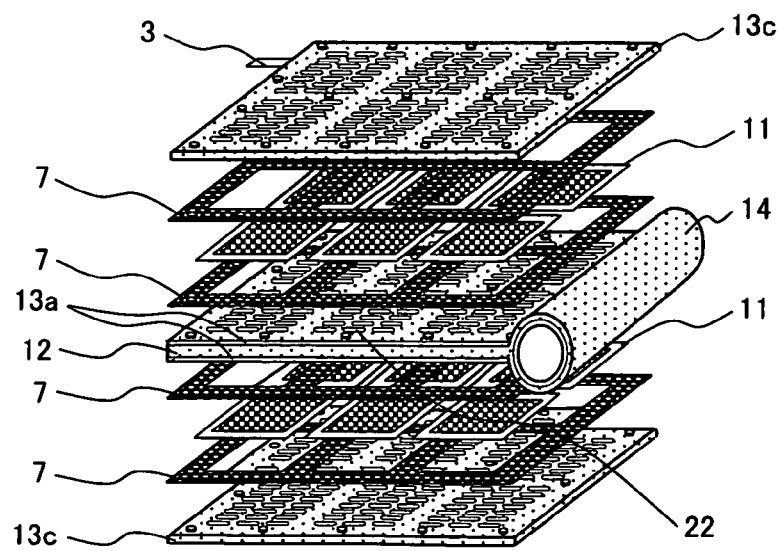
FIG. 2 is a development view illustrating one example of the constitution of a fuel cell power source according to the present invention.

Even during normal operation, it is also possible to receive a signal indicating the fuel level in the fuel cartridge tank 2 and display it on the load equipment. FIG. 2 is a development view of a fuel cell according to one example of the present invention. The fuel cell is formed by stacking an anode endplate 13a, a gasket 7, an MEA 11 with diffusion layer, a gasket 7, and a cathode endplate 13c one after another in the order of mention over one side of the fuel chamber 12 equipped with a fuel cartridge holder, stacking an anode endplate 13a, a gasket 7, an MEA with diffusion layer 11, a gasket 7, and a cathode endplate 13c one after another over the other side of the fuel chamber 12 and then integrating and fixing them with screws 15 (FIG. 4) so as to make the pressure applied in the plane substantially uniform.

Figure 4:
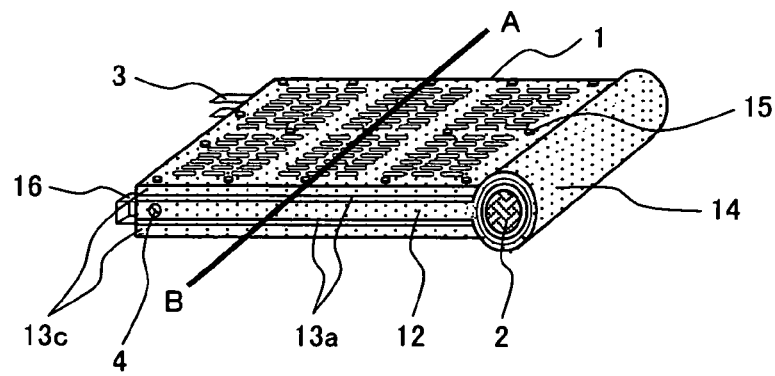
FIG. 4 is perspective view illustrating one example of the structure of a fuel cell structure according to the present invention.

FIG. 4 is a schematic view showing the fuel cell 1 having two power generation portions created such that six MEAs 11 with diffusion layer are arranged on both sides of the stacked and fixed fuel chamber 12. In the fuel cell 1, a plurality of single cells are connected in series on both sides of the fuel chamber 12, and those serially connected single cell groups on both sides are also connected to each other in series via the connection terminal 16, whereby electric power is output from the output terminal 3.

Air serving as an oxidant is supplied by diffusion from an air diffusion slit 22 and water generated at a cathode is diffused and discharged through this slit 22. The fastening method of the cell for obtaining an integrated body is not limited to fastening by screws as disclosed in this Example, but fastening by a compressive force from a chassis in which the cell is inserted, or another method can be employed.

Figure 5:
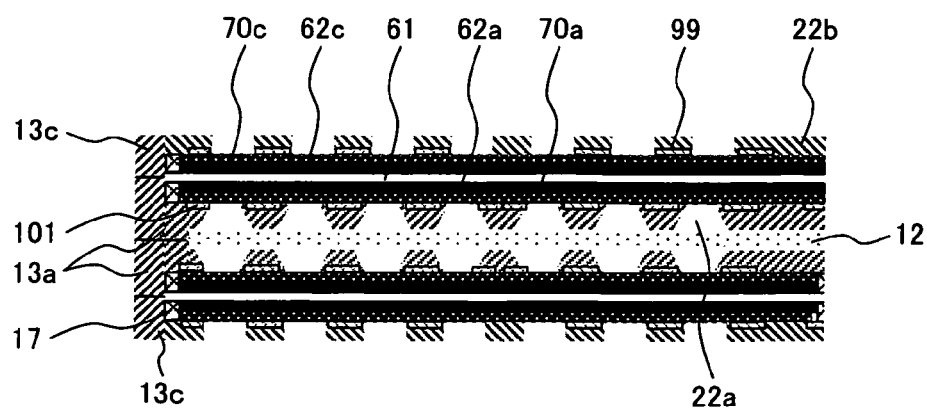
FIG. 5 is a cross-sectional view taken along a line A-B of the fuel cell of FIG. 4.

FIG. 5 is a cross-sectional view taken along a line A-B of FIG. 4. On both sides of the fuel chamber 12, a unit including MEA, cathode diffusion layer 70c, anode diffusion layer 70a, cathode current collector 99, anode current collector 101 and gasket 7 is located. A plurality of the units is formed on one plane and it is sandwiched between the cathode endplate 13c and anode endplate 13a. The cathode endplate 99 has a cathode slit 22c, while the anode endplate 101 has an anode slit 22a formed. The anode current collector also has a slit corresponding to the anode slit and when it has a short side/long side ratio from 0.5 to 0.92, air bubbles of a carbon dioxide gas tend to be broken and can be easily discharged from the anode side. The cathode endplate 12c also has a slit formed therein so that air is introduced from this slit. In such a manner, a passive type fuel cell is formed.

As illustrated in FIG. 6, the fuel chamber 12 has a plurality of ribs 23 for distributing fuel, and they constitute slits 22 which penetrate both sides. The slits 22 also have grooves for distributing fuel. Slits 22a penetrating both sides are formed, supported by the rib support plate 23. The rib support plate 23 is sufficiently thinner than the fuel chamber 12, and also has grooves for distributing fuel. The fuel chamber 12 has an exhaust gas port 4, battery fastening screw holes 25a, a fuel cartridge receiving port 26, and a fuel cartridge holder 14.

No particular limitation is imposed on the material for the fuel chamber 12 insofar as the material is smooth to allow uniform surface pressure to be applied during mounting of MEA and is also insulated so that a plurality of cells installed thereon do not mutually short-circuit. High density vinyl chloride, high-density polyethylene, high density polypropylene, epoxy resin, polyether ether ketone, polyether sulfone, polycarbonate, or such materials reinforced with glass fiber are preferably employed. It is also possible to make the surface of such a material nonconductive by using a carbon plate, steel or nickel, an alloy material such as light-weight aluminum or magnesium, intermetallic compound typified by copper-aluminum, or a variety of stainless steels or impart it with insulating properties by the application of a resin.

The slits 22 for distributing fluid such as fuel or oxidizing gas are parallel grooves in FIG. 4. Another structure can also be selected. A method of bonding cell members with an adhesive polymer film and applying a pressure to the resulting cell by a chassis or the like for fastening them is effective to decrease the weight and thickness of the power source.

FIG. 5 is a cross-sectional view taken along a line A-B of FIG. 4. In this power generating unit, two unit cells are arranged with the fuel chamber 12 therebetween. These two unit cells are each composed of MEA, an anode diffusion layer 70a, cathode diffusion layer 70c, cathode current collector 99, anode current collector 101, gasket 7 and anode endplate 12a and they are interposed between the cathode endplate 13c and anode endplate 13. In this cell, air is diffused from the slits 22c of the cathode endplates 13c on both sides into the fuel cell. In such a manner, a passive type fuel cell making use of natural circulation can be formed without disposing a means for transferring or discharging air or fuel.

The fuel chamber 12 may be combined with a gas discharge module. Each vapor-liquid separation tube of the gas discharge module is fixed through a support hole 24 of the rib support plate 23 provided in the fuel chamber 12. A module substrate is connected to the exhaust gas port 4 and has a function of discharging a gas collected in the vapor-liquid separation tube outside the cell. When such a structure is adopted, the vapor-liquid separation tube can be installed at almost an equal distance from two anodes which are opposite to each other in the vicinity of the anode-on which carbon dioxide is generated. When the fuel cartridge is mounted, the fuel chamber is therefore filled with fuel under a predetermined pressure. When power generation is not conducted, fuel cannot enter into the pores until the pressure reaches a certain level, disturbed by the water repellency of the vapor-liquid separation tube. Accordingly, fuel does not leak when the pressure is less than a certain level. A carbon dioxide gas generated owing to the deaeration of a gas dissolved in fuel or starting of power generation is collected in the vapor-liquid separation tube and discharged outside the cell under the pressure of the liquid fuel. The film thickness, average pore size, pore distribution and aperture ratio of the vapor-liquid separation tube are determined based on the initial and final pressures of the fuel cartridge and the production amount of a carbon dioxide gas at the maximum output time of the cell.

FIGS. 7A and 7B show the structure of the anode endplate 13a to be joined to the fuel chamber. FIG. 7A is its plan view and FIG. 7B is a cross-sectional view taken along a line A-A. Six single cells are disposed on one surface of the anode end plate 13a, and three current collectors 42a, 42b and 42c having electronic conductivity and corrosion resistance are integrated with an insulating sheet 41 to attain electrical connection in series. Each current collector has a plurality of slits 22b. The insulating sheet 41 has a plurality of screw holes 25b to fasten and integrate fuel cell components. No particular limitation is imposed on the material of the insulating sheet 41 constituting the anode endplate 13a insofar as it permits joining thereto of the current collectors 42 disposed on the surface of the sheet and can ensure insulation properties and planarity. Preferred examples of the material include high-density vinyl chloride, high-density polyethylene, high-density polypropylene, epoxy resin, polyether ether ketone, polyether sulfone, polycarbonate, polyimide resins and these materials reinforced with glass fiber. The sheet can be joined with the current collector 42 after the surface is made non-conductive by using an alloy material such as copper, nickel, light-weight aluminum or magnesium, or an intermetallic compound typified by copper-aluminum or various stainless steels or by applying a resin to impart insulation properties.

Figure 8A:
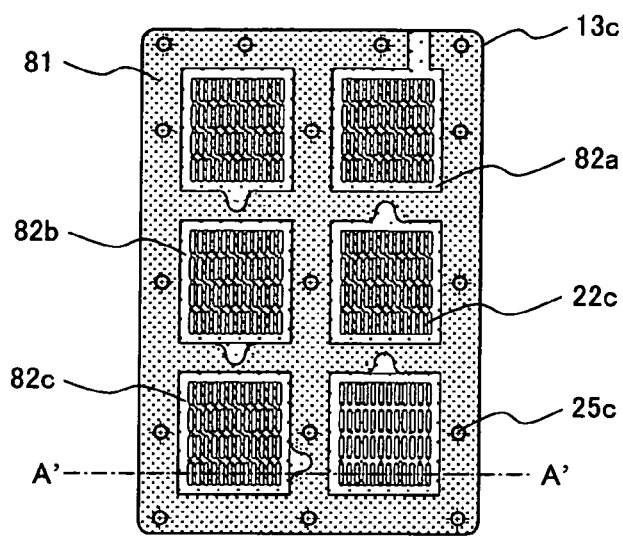
FIG. 8A and FIG. 8B are a plan view and a cross-sectional view illustrating one example of a cathode endplate structure according to the present invention.
Figure 8B:

FIGS. 8A and 8B show an example of the structure of the cathode end plate 13c on which a plurality of unit cells are disposed in series. FIG. 8A is a plan view and FIG. 8B is a cross-sectional view taken along a line A'-A. The cathode end plate 13c has countersunk portions 82a, 82b and 82c which join a plurality of current collectors 42 to a substrate 81, slits 22c for diffusing air used as an oxidizing agent and vapor to these countersunk portions 82a, 82b and 82c, and screw holes 25c to integrate and fasten fuel cell components. No particular limitation is imposed on the material of the substrate 81 insofar as it permits joining thereto of the current collector 42 disposed in the surface of the substrate, can ensure insulation properties and planarity, and has enough rigidity to permit in-plane fastening so that a contact resistance with MEA becomes sufficiently low.

Preferred examples of the material include high-density vinyl chloride, high-density polyethylene, high-density polypropylene, epoxy resin, polyether ether ketone, polyether sulfone, polycarbonate, polyimide resin, or these materials reinforced with glass fiber. It is also possible to join the substrate to the current collectors 42 by making its surface non-conductive by using an alloy material such as copper, nickel, light-weight aluminum or magnesium, or an intermetallic compound typified by copper-aluminum or various stainless steels or applying a resin to the surface to impart insulation properties.

Figure 9A:
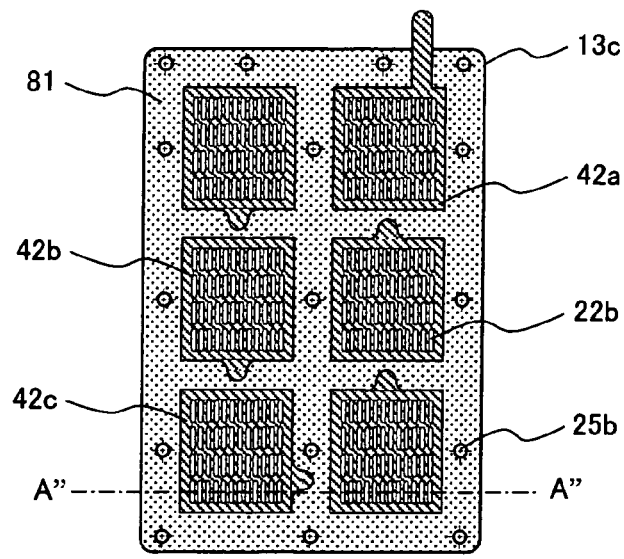
FIG. 9A and FIG. 9B are a plan view and a cross-sectional view illustrating one example of a current collector/cathode endplate integrated structure according to the present invention.
Figure 9B:
Figure 10A:
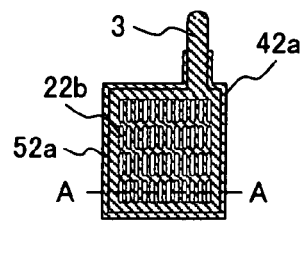
FIGS. 10A, 10B and 10C are plan views illustrating examples of an anode current collector structure according to the present invention.
Figure 10B:
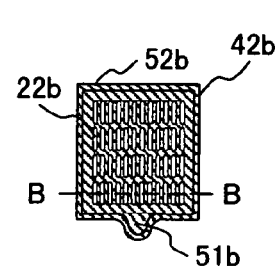
Figure 10C:
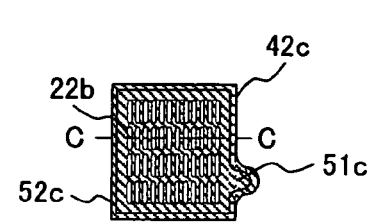

FIGS. 9A and 9B are schematic views of the cathode endplate 13c, on which current collectors disclosed in FIGS. 10A, 10B, and 10C are fitted into the countersunk portions 82 of the substrate 81 shown in FIGS. 8A and 8B. FIG. 9A is a plan view, while FIG. 9B is a cross-sectional view taken along a line A"-A". The cathode endplate 13c has, disposed on one plane thereof, six current collectors 42 which come in contact with the cathodes of six single cells to collect electricity, and also screw holes 25b for integrating and fastening fuel cell components. It is preferred that the current collectors 42 be fitted into countersunk portions 82a and 82b and bonded via adhesives so that one flat surface can be formed together with the flange surface of the substrate 81. Any adhesive can be used insofar as it neither dissolves in nor swells with an aqueous methanol solution and has more electrochemically stable than methanol. Epoxy resin type adhesives are suited.

The current collectors 42 can be fixed not only by an adhesive but also by disposing, in a portion of the countersunk portions on the substrate 81, a protrusion which is fitted in some of the slits 22c disposed in the current collector 42 or in an especially disposed fitting hole. Furthermore, the current collectors 42 and one side of the substrate 81 do not necessarily form one flat surface. When there exists a step difference at this portion, current collectors 42 can be directly bonded onto the substrate 81 without providing countersunk portions 82a and 82b. In such a case, the structure or thickness of the gasket used for sealing may be changed.

FIGS. 10A, 10B, and 10C show the structure of current collectors to be bonded onto the anode endplate 13a and the cathode endplate 13c disclosed in FIGS. 7A, 7B, 9A, and 9B. Three types 42a, 42b and 42c of current collectors which are different in shape are used to connect single cells, which exist on one plane, in series. The current collector 42a is equipped with an output terminal 3 of a cell and has slits 22b on its plane to diffuse fuel or air used as an oxidizing agent. The current collectors 42b and 42c each has interconnectors 51b and 51c to connect single cells in series on each flat surface and also has slits 22b. Furthermore, when those current collectors 42 are disposed on the anode end plate 13a, fins 52 are provided to integrate and bond those current collectors 42 with the insulating sheet 41 disclosed in FIG. 7. On the contrary, when those current collectors 42 are disposed on the cathode endplate 13c, current collectors 42 having no fins 52 are selected.

No particular limitation is imposed on the material used for the current collectors 42. Examples of the material usable for them include a carbon plate, plates made of a metal such as stainless steel, titanium, or tantalum, and composite materials of such a metallic material with another metal such as carbon steel and stainless steel, and clad materials with copper or nickel. Furthermore, in the metallic current collector, it is effective to apply a corrosion resistant rare metal such as gold or to apply a conductive carbon paint to the processed electrical contact portion of the current collector so as to reduce the contact resistance upon installation, thereby increasing the output density and long-term performance stability of the cell.

Figure 11A:
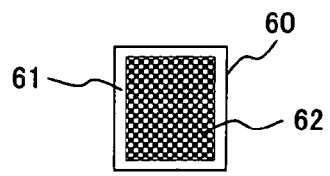
FIGS. 11A, 11B and 11C are plan views illustrating examples of the structures of MEA and diffusion layer according to the present invention.

FIG. 11A illustrates the structure of MEA60 used in Examples of the present invention. An alkylsulfonated polyethersulfone is used as the electrolyte membrane 61, platinum and ruthenium are used as a carbon carrier ("XC72R", trade name; product of Cabot Corporation) for the anode electrode 62a, a platinum-bearing catalyst is used as a carbon carrier ("XC72R", trade name; product of Cabot Corporation) for the cathode electrode 62, and a polymer similar to the alkylsulfonated polyethersulfone used as the electrolyte membrane but having a smaller sulfonated equivalent weight than that of the electrolyte membrane is used as a binder. Selection of such a binder enables to increase the crossover amount of water and methanol of the electrolyte dispersed in an electrode catalyst, which accelerates the diffusion of fuel onto the electrode catalyst and improves the performance of the electrode.

Figure 11B:
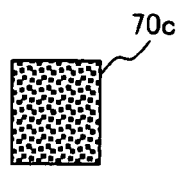
Figure 11C:
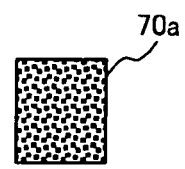

FIGS. 11B and 11C show the constitution of a cathode diffusion layer 70c and an anode diffusion layer 70a, respectively, used for the present invention. The cathode diffusion layer 70c is composed of a porous carbon substrate and a water-repellent layer for preventing diffusion and discharge of vapor thus produced and cohesion of water by reinforcing water repellency and heightening vapor pressure in the vicinity of the cathode. The water-repellent layer is stacked so that it is brought into contact with the cathode electrode 62c. No particular limitation is imposed on the surface contact between the anode diffusion layer 70a and the anode electrode 62a, and a porous carbon substrate is used. A conductive and porous material is used for the porous carbon substrate 71c on the cathode diffusion layer 70c. The cathode diffusion layer is usually prepared by mixing carbon fiber woven cloth or nonwoven cloth, for example, carbon cloth (Torayca cloth 72) as carbon fiber woven fabric with carbon powder and water repellent fine particles, water repellent fibril or water repellent fibers such as polytetrafluoroethylene.

Described specifically, carbon paper ("TGP-H-060", trade name; product of Toray) is cut into a predetermined size, and the amount of water absorption is determined in advance. The carbon paper is immersed in a diluted polytetrafluorocarbon/water dispersion ("D-1", trade name; product of Daikin Industries, Ltd.) so that the weight ratio after the carbon paper is baked will become 20 to 60 wt %, dried at a temperature of 120° C. for about one hour, and then baked in the air at temperatures between 270 and 360° C. for 0.5 to 1 hour. To carbon powder ("XC-72R", trade name; product of Cabot Corporation) is added a polytetrafluorocarbon/water dispersion in an amount of from 20 to 60 wt. % based on the carbon powder, followed by kneading. The kneaded mass in the paste form was applied to one side of the above-described water-repellent carbon paper until the thickness of the coating becomes 10 to 30 μm. After drying at a temperature of 120° C. for about one hour, the coating is baked in the air at temperatures between 270 and 360° C. for 0.5 to 1 hour, whereby a cathode diffusion layer 170c is obtained. The air permeability and moisture permeability of the cathode diffusion layer 170c, that is, diffusion property of supplied oxygen and generated water, greatly depends on the amount of polytetrafluoroethylene, dispersibility, and baking temperature. Therefore, appropriate conditions are selected after due consideration of the designed performance of the fuel cell and use environment.

As a material of the anode diffusion layer 70a, a woven or nonwoven cloth made of carbon fiber which is both conductive and porous, for example, carbon cloth ("Torayca cloth", trade name; product of Toray Industries) and carbon paper ("TGP-H-060", trade name; product of Toray Industries) are suitable. The anode diffusion layer 70a has a function of promoting supply of an aqueous fuel solution and quick dissipation of a generated carbon dioxide gas. In order to inhibit a carbon dioxide gas generated on the anode from forming bubbles in the porous carbon substrate 71a, thereby heightening the output density of the fuel cell, a method of hydrophilizing the surface of the porous carbon substrate 71a by mild oxidation or ultraviolet exposure, a method of dispersing a hydrophilic resin in the porous carbon substrate 71a, and a method of dispersing a strongly hydrophilic substance typified by titanium oxide and having the substance supported on the substrate. The material of the anode diffusion layer 70a is not limited to the above-described material but porous materials such as substantially electrochemically inactive metal materials (such as stainless steel fiber nonwoven fabric, porous materials, porous titanium, tantalum and the like) can also be used.

Figure 12A:
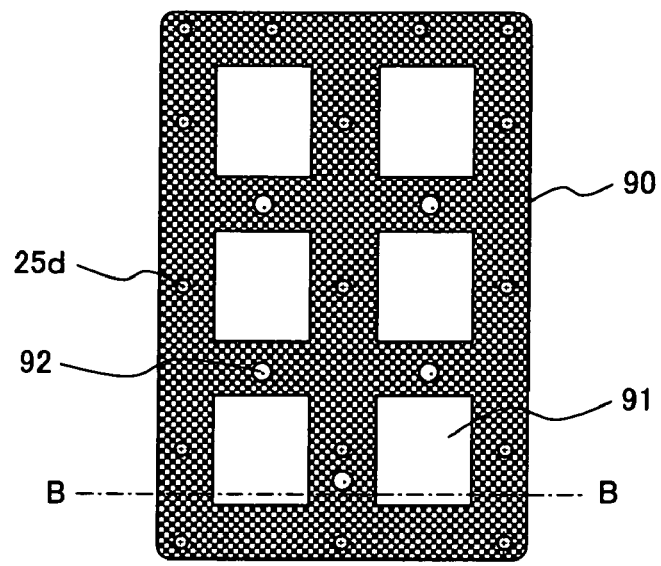
FIGS. 12A and 12B are a plan view and a cross-sectional view illustrating one example of a gasket structure according to the present invention.
Figure 12B:

FIGS. 12A and 12B show the structure of a gasket 90 to be used for the fuel cell according to the present invention. FIG. 12A is a plan view, while FIG. 12B is a cross-sectional view taken along a line B-B. The gasket 90 is composed of completely cut-out electricity-carrying portions 91 which correspond to a plurality of MEAs to be mounted, a plurality of screw holes 25d through which fastening screws pass, and connection holes 92 through which a conductor to which the interconnector 51 of the anode end plate 13a and the cathode end plate are to be connected. The gasket 90 serves to seal both fuel supplied to the anode electrode 62a and oxidizing gas supplied to the cathode electrode 62c. Ordinarily employed materials such as synthetic rubber such as EPDM, fluorinated rubber, and silicon rubber can be used as the gasket material.

Figure 13:
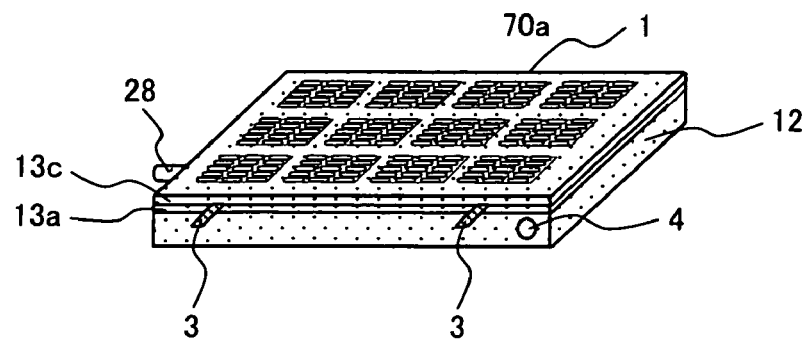
FIG. 13 is a schematic view illustrating a fuel cell according to another example of the present invention.

One example of a DMFC for personal digital assistance will hereinafter be described. FIG. 13 is a schematic view of a DMFC according to the present invention. A fuel cell 1 has a fuel chamber 12, unillustrated MEA using sulfomethylated polyether sulfone as an electrolyte membrane, and a cathode endplate 13c and an anode end plate 13a having a gasket interposed therebetween. A power generation portion is installed only on one side of the fuel chamber 12. This fuel chamber 12 has, at the outer circumference thereof, a fuel supply tube 28 and an exhaust gas port 4. Furthermore, a pair of output terminals 3 is provided on the outer circumference of the anode endplate 13a and the cathode endplate 13c. The fuel cell assembly has a similar component constitution to that illustrated in FIG. 2 except that a power generation portion is installed only on one side of the fuel chamber and the fuel cartridge holder is not integrated into the assembly. With regards to the materials, high pressure vinyl chloride is employed for the fuel chamber 12, a polyimide resin film is employed for the anode endplate, and a glass fiber reinforced epoxy resin is employed for the cathode endplate.

Figure 14A:
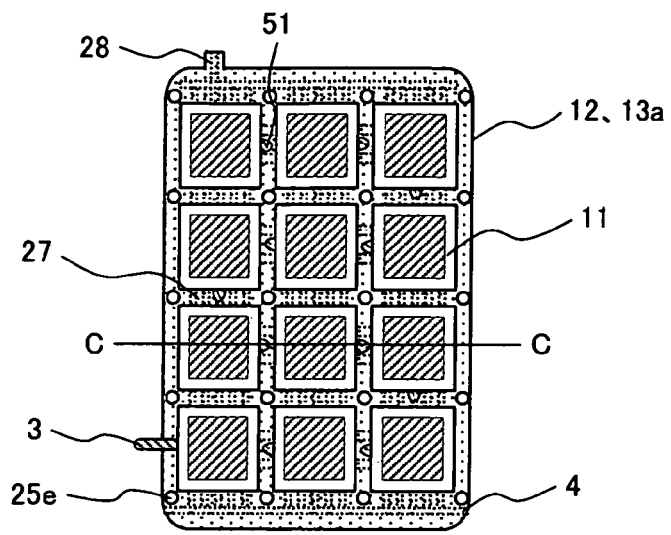
FIGS. 14A and 14B are a plan view and a cross-sectional view illustrating a fuel chamber/anode endplate integrated structure according to the example of the present invention having-MEA located therein.
Figure 14B:
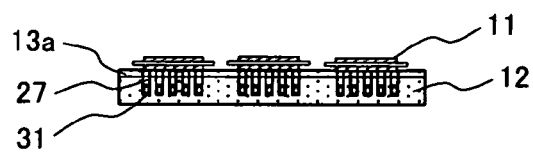

FIGS. 14A and 14B show the layout of the installed MEAs and its cross-sectional structure. FIG. 14A is a plan view, while FIG. 14B is a cross-sectional view taken along a line C-C of FIG. 14A. On this DMFC, twelve 22 mm×24 mm MEAs, each having a power generation portion of 16 mm×18 mm, are installed in the surface slit portions of the anode endplate 13a which has been integrated with the fuel chamber 12. As shown in a C-C cross-sectional view of FIG. 14B, a vapor-liquid separation module combined with a vapor-liquid separation tube 31 is inserted into a fuel distribution groove 27 provided in the fuel chamber 12. One end of the vapor-liquid separation module is connected to an exhaust-gas port 4. The other end of the fuel distribution groove 27 is connected to a fuel supply tube 28 located on the outer circumference of the fuel chamber 12. A current collector, not shown in FIGS. 14A and 14B, is adhered to the outer surface of the anode endplate 13a so that it forms a flat surface with the surface of the anode end plate. An interconnector 51 for connecting single cells in series and an output terminal 3 are disposed.

Figure 15A:
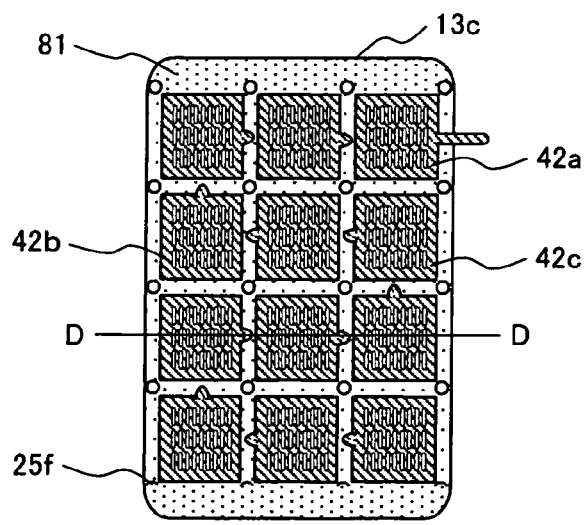
FIGS. 15A and 15B are a plan view and a cross-sectional view illustrating one example of a cathode endplate structure equipped with a current collector according to the present invention.
Figure 15B:
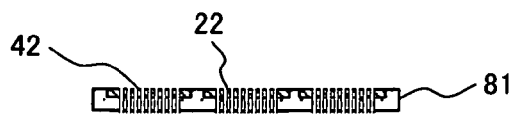

A 0.3-mm thick titanium plate is used as a material of the current collector. After the surface which comes in contact with the electrode is washed, gold of about 0.1 μm thick is deposited on the surface. FIGS. 15A and 15B show the structure of the cathode endplate 13c for fixing MEAs thereonto and connecting cells in series. FIG. 15A is a plan view, while FIG. 15B is a cross-sectional view taken along a line D-D. A 2.5 mm thick glass-fiber reinforced epoxy resin plate is used as a substrate 81 for the cathode endplate 13c. To the surface of the substrate, current collectors 42a, 42b and 42c of 0.3 mm thick made of titanium, onto which gold has also been deposited, are bonded by an epoxy resin. The substrate 81 and the current collector 40 have air diffusing slits 22 in advance, and they are bonded so as to communicate with each other.

It is desired to activate a fuel cell at high temperature in order to heighten the catalytic activity of the electrode, thereby decreasing an excessive voltage of the electrode. In particular, prompt discharge of a gas such as carbon dioxide generated on an anode to prevent an increase in the internal pressure is effective in the passive type fuel cell which does not employ a forced fuel supplying mechanism such as pump.

A small-sized-power source capable of continuing power generation for long hours can be actualized by manufacturing a plurality of single cells composed of an anode, an electrolyte membrane and a cathode, connecting these single cells in series via an electroconductive interconnector to increase voltage, operate without using an auxiliary machine for supplying fuel or oxidizing agent forcedly or without using an auxiliary machine for forced cooling of a fuel cell and using as a liquid fuel an aqueous methanol solution having a high volume energy density. This small-sized power source can be driven after incorporated as a power source, for example, in a mobile phone, laptop personal computer, or mobile video camera. It can be operated for long hours by supplying fuel, which has been prepared in advance, whenever necessary. In order to drastically decrease the frequency of fuel supply compared with the above-described case, it is effective to use the small-sized power source as a battery charger after bonding it to a charger of a mobile phone equipped with a secondary battery, a laptop personal computer or a mobile video camera and installing it to a portion of its housing case. In this case, when the mobile electronic device is used, it is taken out from its housing case and driven by a secondary battery, while when it is not used, it is housed in the case and a small-sized fuel cell power generator built in the case is connected via a charger to charge the secondary battery. In this manner, the volume of a fuel tank can be increased and frequency of fuel supply can be drastically reduced.

EXAMPLES

The present invention will hereinafter be described more specifically. It should however be borne in mind that the present invention is not limited only to the examples disclosed herein.

Contact angle, foam discharging performance, internal pressure and output voltage are each measured in the following manner.

(1) Measurement of Contact Angle

Samples subjected to predetermined treatment were immersed in a 20 wt. % aqueous methanol solution contained in a Teflon (trade mark) vessel and the vessel was put in a SUS pressure container. The pressure container was allowed to stand in a thermostat bath of 60° C. The samples were taken out after 2 days, 15 days and 60 days, respectively and wiped gently with "Kimwipe". The contact angle with water was then measured using a contact angle meter "CA-D" (trade name) manufactured by Kyowa Interface Science.

Figure 16:
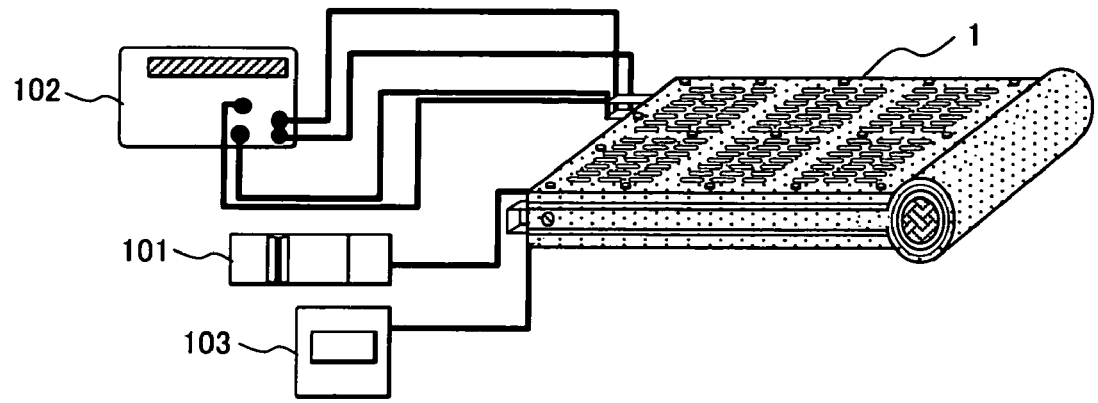
FIG. 16 illustrates the constitution of the measurement system of internal pressure, fuel concentration and output voltage during application of a load of 50 mA/cm$^2$, each of a fuel cell according to the present invention.

(2) Measurement of Foam Discharging Performance, Internal Pressure and Output Voltage A DMFC having a constitution as illustrated in FIG. 16 was prepared. A load current density of 50 mA was applied to the DMFC using a low current power source (102) while supplying it with a fuel from a cartridge (101) filled with a 20 wt. % aqueous methanol solution. The foam discharging performance was visually observed, the pressure in the DMFC (1) was measured using a manometer (103) and an output voltage was measured with the passage of time.

Figure 17:
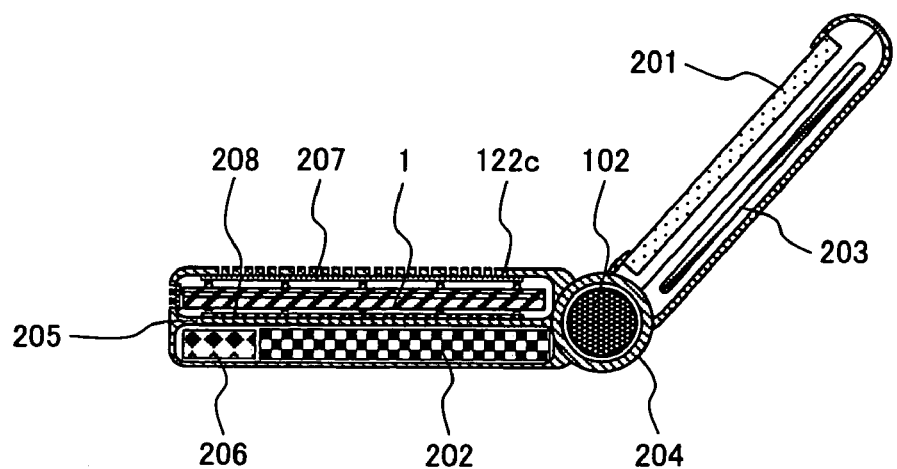
FIG. 17 illustrates one example of the structure of a personal digital assistance having the fuel cell of the present invention mounted thereon.

FIG. 17 shows the structure of personal digital assistance having built therein a fuel cell according to the embodiment of the present invention. In this drawing, a fuel cell 1 is mounted on a mobile terminal equipped with a display 201, main board 202, antenna 203 and lithium ion secondary battery 206. The fuel cell 1 is located on the right side over the main board so as not to disturb the operation of the main board. The fuel cell 1 has, on the upper surface thereof, an air filter 207 having a filter hole 211c. A display 201 is set up by making use of a hinge 204 equipped with a cartridge holder 102. The fuel cell 1 and the lithium battery 206 are partitioned by a bulkhead 205 and a water absorbing quick drying material 208 is placed to avoid an adverse effect on the lithium battery.

Example 1

(1) Synthesis of Chloromethylated Polyethersulfone

After a 500-ml four-necked round-bottom flask equipped with a stirrer, a thermometer, and a reflux condenser having a calcium chloride tube connected thereto was purged with nitrogen, 30 g of polyethersulfone (PES) and 250 ml of tetrachloroethane were charged in the flask, followed by the addition of 40 ml of chloromethyl methyl ether. A mixed solution of 1 ml of anhydrous tin chloride (IV) and 20 ml of tetrachloroethane was added dropwise. The reaction mixture was heated to 80° C. and stirred under heating for 90 minutes. The reaction mixture was charged in 1 liter of methanol to precipitate the corresponding polymer. The polymer thus precipitated was pulverized in a mixer and washed with methanol to yield chloromethylated polyethersulfone. The nuclear magnetic resonance spectrum of it revealed that the introduction ratio of a chloromethyl group {a ratio of a structural unit having a chloromethyl group introduced in it relative to the whole structural unit (total of x and y) in the formula (1)} was 36%.

Chemical formula 1

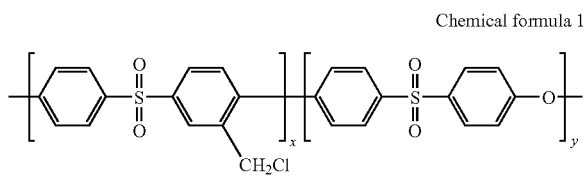

(2) Synthesis of Acetylthio-Introduced Polyethersulfone

The chloromethylated polyethersulfone thus obtained was charged in a 1000-ml four-necked round-bottom flask equipped with a stirrer, a thermometer, and a reflux condenser having a calcium chloride tube connected thereto. After addition of 600 ml of N-methylpyrrolidone, a solution of 9 g of potassium thioacetate and 50 ml of N-methylpyrrolidone (NMP) were added to the resulting mixture, followed by heating to 80° C. and stirring under heat for 3 hours. The reaction mixture was charged in 1 liter of water to precipitate the corresponding polymer. The precipitate thus obtained was pulverized in a mixer, washed with water, and dried by heating to yield 32 g of acetylthio-introduced polyethersulfone.

(3) Synthesis of Sulfomethylated Polyethersulfone

In a 500-ml four-necked round bottom flask equipped with a stirrer, a thermometer and a ref lux condenser having a calcium chloride tube connected thereto was charged 20 g of the resulting acetylthio-introduced polyethersulfone. To the resulting flask was added 300 ml of acetic acid. Then, 20 ml of hydrogen peroxide was added and the resulting mixture was heated to 45° C. and stirred under heat for 4 hours. The reaction mixture was then added to 1 liter of a 6N aqueous solution of sodium hydroxide while cooling and stirring was continued for a while. A polymer was obtained by filtering the reaction mixture and washed until removal of an alkaline component. The resulting polymer was added to 300 ml of 1N hydrochloric acid and the mixture was stirred for a while. The resulting mixture was filtered to yield a polymer and the polymer was washed until the removal of an acid component. The residue was dried under reduced pressure to yield 20 g of sulfomethylated polyethersulfone at a stoichiometric ratio. Existence of a sulfomethyl group was confirmed from the fact that the methylene proton of NMR showed the chemical shift to 3.78 ppm. The introduction ratio of a sulfomethyl group {a ratio of a structural unit having a sulfomethyl group introduced therein relative to the whole structural unit (total of x and y) in the formula (2)} was 36% based on the introduction ratio of a chloromethyl group.

Chemical formula 2

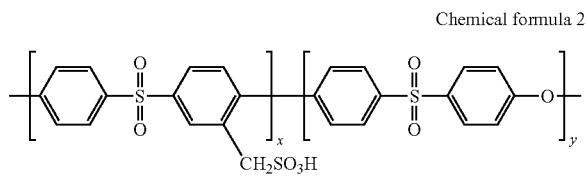

(4) Preparation of Electrolyte Membrane

The sulfomethylated polyethersulfone obtained above in (3) was dissolved in a 1/1 mixed solvent of dimethylacetamide and methoxyethanol so as to give a 5 wt. % concentration. The resulting solution was applied onto glass by spin coating, air-dried and vacuum dried at 80° C. to prepare a sulfomethylated polyethersulfone electrolyte membrane of 42 µm thick. The methanol permeability and ion conductivity of the resulting electrolyte membrane at room temperature were 12 mA/cm$^2$ and 0.053 S/cm, respectively.

(4) Preparation of Electrolyte Membrane Electrode Assembly (MEA)

A slurry of a catalyst powder having 50 wt. % of 1/1 (atomic ratio)-platinum/ruthenium alloy fine particles dispersed and borne on a carbon carrier and a 30 wt. % solution of the sulfomethylated polyethersulfone in a mixed solvent of 1-propanol, 2-propanol and methoxyethanol was prepared and an anode porous membrane of about 30 µm thick was formed over a polyimide film by screen printing. Then, a slurry in a water/alcohol mixed solvent was prepared using a catalyst powder having 30 wt. % of platinum fine particles borne on a carbon carrier and a solution of the sulfomethylated polyethersulfone obtained above in (3) in 1-propanol, 2-propanol and methoxyethanol as a binder. By using the resulting slurry, a cathode porous membrane of about 10 µm thick was formed on a polyimide film by screen printing. The anode porous membrane and cathode porous membrane thus prepared were cut respectively into anode electrode and cathode electrode of 10 mm wide and 20 mm long.

After the surface of the anode electrode was immersed with about 0.5 ml of a 5 wt. % solution of the sulfomethylated polyethersulfone obtained above in (3) in a mixed solvent of 1-propanol, 2-propanol and methoxyethanol, the resulting anode electrode was bonded to a power generation portion of the sulfomethylated polyethersulfone electrolyte membrane obtained above in (4) and cut into a 16 mm×33 mm piece. A load of about 1 kg was applied and dried at 80° C. for 3 hours. The surface of the cathode electrode was then immersed with about 0.5 ml of a 5 wt. % solution of the sulfomethylated polyethersulfone in a mixed solvent of 1-propanol, 2-propanol and methoxy ethanol. The resulting cathode electrode was bonded to the electrolyte membrane so that it overlapped the anode layer bonded previously. About 1 kg of a load was applied to the cathode electrode, followed by drying at 80° C. for 3 hours to yield an MEA (i).

A slurry of a catalyst powder having 50 wt. % of a 1/1 (atomic ratio) platinum/ruthenium alloy fine particles dispersed and borne on a carbon catalyst and a 30 wt. % of a solution of the sulfomethylated polyethersulfone obtained above in (3) in a mixed solvent of 1-propanol, 2-propanol and methoxyethanol was prepared. By using the resulting slurry, an anode porous membrane of about 30 µm thick was formed on a polyimide film by screen printing. A slurry in a water/alcohol mixed solvent was prepared using a catalyst powder having 30 wt. % of platinum fine particles borne on a carbon carrier and 30 wt. % of a perfluorocarbonsulfonic acid ("Nafion 117", trade name; product of DuPont) electrolyte as a binder. By using the resulting slurry, a cathode porous membrane of about 10 µm thick was prepared on a polyimide film by screen printing.

The anode porous membrane and cathode porous membrane thus prepared were cut, respectively, into an anode electrode and a cathode electrode of 10 mm wide and 20 mm long. After the surface of the anode electrode was immersed with about 0.5 ml of a 5 wt. % solution of the sulfomethylated polyethersulfone obtained above in (3) in a mixed solvent of 1-propanol, 2-propanol and methoxyethanol, the resulting anode electrode was bonded to the power generation portion of the sulfomethylated polyethersulfone electrolyte membrane prepared above in (4) and cut into a piece of 16 mm wide and 33 mm long. A load of about 1 kg was applied, followed by drying at 80° C. for 3 hours. Then, the surface of the cathode electrode was immersed with about 0.5 ml of a 5 wt. % alcohol/water solution (a 20:40:40 (weight ratio) mixed solvent of water, isopropanol and n-propanol; product of Fluka Chemika) of Nafion 117. The resulting cathode electrode was bonded to the electrolyte membrane so as to overlap the anode layer bonded thereto previously. A load of about 1 kg was applied, followed by drying at 80° C. for 3 hours to prepare MEA (2).

A slurry in a water/alcohol mixed solvent (a 20/40/40 (weight ratio) mixed solvent of water, isopropanol and n-alcohol) was prepared using a catalyst powder having 50 wt. % of a 1/1 (atomic ratio) platinum/ruthenium alloy fine particles dispersed and borne on a carbon catalyst and 30 wt. % perfluorocarbonsulfonic acid ("Nafion 117", trade name; product of DuPont) electrolyte as a binder. By using the resulting slurry, an anode porous membrane of about 30 μm thick was formed on a polyimide film by screen printing. Another slurry in a water/alcohol mixed solvent was prepared using a catalyst powder having 30 wt. % of platinum fine particles borne on a carbon carrier and 30 wt. % perfluorocarbonsulfonic acid ("Nafion 117", trade name; product of DuPont) electrolyte as a binder. By using the resulting slurry, a cathode porous membrane of about 10 μm thick was prepared on a polyimide film by screen printing. The anode porous membrane and cathode porous membrane thus prepared were cut, respectively, into an anode electrode and a cathode electrode of 10 mm wide and 20 mm long. After the surface of the anode electrode was immersed with about 0.5 ml of a 5 wt. % solution of Nafion 117 in an alcohol/water solvent (a 20/40/40 (weight ratio) mixed solvent of water, isopropanol and n-propanol; product of Fluka Chemika), the resulting anode electrode was bonded to the power generation portion of the sulfomethylated polyethersulfone electrolyte membrane prepared above in (4) and cut into a piece of 16 mm wide and 33 mm long. A load of about 1 kg was applied, followed by drying at 80° C. for 3 hours.

Then, the surface of the cathode electrode was immersed with about 0.5 ml of a 5 wt. % solution of Nafion 117 in an alcohol/water mixed solvent (a 20/40/40 (weight ratio) mixed solvent of water, isopropanol and n-propanol; product of Fluka Chemika). The resulting cathode electrode was bonded to the electrolyte membrane so as to overlap the anode layer bonded thereto previously. A load of about 1 kg was applied, followed by drying at 80° C. for 3 hours to prepare MEA (3).

(5) Preparation of a Diffusion Layer

A water based dispersion ("Dispersion D-1", trade name; product of Daikin Industry) of a water repellent, more specifically, polytetrafluoroethylene (PTFE) fine particles was added to carbon powder so as to give its weight of 40 wt. % after baking. The resulting mixture was kneaded. The paste thus obtained was applied to one side of a carbon cloth of about 350 μm thick and having a porosity of 87%, followed by drying at room temperature and then baking at 270° C. for 3 hours, whereby a carbon sheet was obtained. The amount of PTFE was adjusted to fall within a range of from 5 to 20 wt. % relative to that of the carbon cloth. The sheet thus obtained was cut into a similar size to that of the electrode of the MEA, whereby a cathode diffusion layer was obtained.

As an anode diffusion layer of (A) of Example 1, a carbon cloth not subjected to treatment and having a thickness of about 350 μm and a porosity of 87% was used. The carbon cloth of about 350 μm thick and having a porosity of 87% was immersed in fuming sulfuric acid (concentration: 60%) and kept at 60° C. for 2 days under a nitrogen gas stream. The temperature of the flask was cooled to room temperature. The fuming sulfuric acid was removed and the carbon cloth was washed sufficiently with distilled water until the distilled water became neutral. The resulting carbon cloth was then immersed in methanol, followed by drying. As a result of infrared absorption spectrum of the carbon cloth, absorption based on —$OSO_3H$ group was observed at 1225 $cm^{-1}$ and 1413 $cm^{-1}$. In addition, absorption based on —OH group was observed at 1049 $cm^{-1}$. This suggests that —$OSO_3H$ group and —OH group have been introduced into the surface of the carbon cloth and it is hydrophilic judging from the contact angle of it smaller than the contact angle 81° between a carbon cloth not treated with fuming sulfuric acid and an aqueous methanol solution. In addition, it has excellent conductivity. The carbon cloth thus obtained was cut into an equal size to that of the above-described MEA and used as a cathode diffusion layer (B) of Example 1 subjected to hydrophilization treatment (1).

To 297 parts by weight of tetrahydrofuran was added 1 part by weight of polyethylene glycol having a molecular weight of 20,000. The resulting mixture was stirred under heating to 50° C. to prepare the corresponding solution. To the resulting solution was added 2 parts by weight of "Sila-Ace S330" (trade name; product of Chisso Corporation) having both an amino group and an alkoxysilane residue, followed by stirring to prepare a hydrophilic film forming coating. In the resulting coating, a carbon cloth having a thickness of about 350 μm and having a porosity of 87% and subjected to oxygen plasma treatment was immersed and the resulting cloth was heat treated at 100° C. for 20 minutes. The carbon cloth was cut into an equal size to that of the electrode of the above-described MEA and used as a cathode layer (C) of Example 1 subjected to hydrophilization treatment (2).

Carbon paper having a thickness of about 150 μm and porosity of 87% was immersed in fuming sulfuric acid (concentration: 60%) and kept at 60° C. for 2 days under a nitrogen gas stream. The temperature of the flask was then cooled to room temperature. The fuming sulfuric acid was removed and the carbon paper was washed completely with distilled water until the water became neutral. The resulting carbon paper was then immersed in methanol, followed by drying. As a result of infrared absorption spectrum of the carbon paper, absorption based on —$OSO_3H$ group was observed at 1225 $cm^{-1}$ and 1413 $cm^{-1}$. In addition, absorption based on —OH group was observed at 1049 $cm^{-1}$. This suggests that —$OSO_3H$ group and —OH group have been introduced into the surface of the carbon paper and it is hydrophilic judging from the contact angle of it smaller than the contact angle 81° between carbon paper not treated with fuming sulfuric acid and an aqueous methanol solution. In addition, it has excellent conductivity. The carbon paper thus obtained was cut into a similar size to that of the electrode of above-described MEA and used as a cathode diffusion layer (D) of Example 1 subjected to hydrophilization treatment (3).

To 297 parts by weight of tetrahydrofuran was added 1 part by weight of polyethylene glycol having a molecular weight of 20,000. The resulting mixture was stirred under heating to 500° C. to prepare the corresponding solution. To the resulting solution was added 2 parts by weight of "Sila-Ace S330" (trade name; product of Chisso Corporation) having both an amino group and an alkoxysilane residue, followed by stirring to prepare a hydrophilic film forming coating. In the resulting coating, carbon paper having a thickness of about 150 μm and a porosity of 87% and subjected to oxygen plasma treatment was immersed for about 5 minutes. The resulting carbon paper was taken out from the coating and heat treated at 100° C. for 20 minutes. The resulting hydrophilized carbon paper was cut into an equal size to that of the electrode of the above-described MEA and used as a cathode layer (E) of Example 1 subjected to hydrophilization treatment (4).

(6) Measurement of Contact Angle

Anode diffusion layers subjected to water repellent treatment, no treatment, hydrophilization treatment (1), hydrophilization treatment (2), hydrophilization treatment (3) and hydrophilization treatment (4) were immersed in a 20 wt. % aqueous methanol solution contained in a Teflon (trade mark) vessel and the vessel was put in a SUS pressure container. The pressure container was allowed to stand in a thermostat bath of 60° C. The samples were taken out after 2 days, 15 days and 60 days, respectively and wiped gently with "Kimwipe". The contact angle with water was then measured using a contact angle meter "CA-D" (trade name) manufactured by Kyowa Interface Science. As a result, as illustrated in Table 1, the anode diffusion layers of Comparative Example subjected to water repellent treatment each had a contact angle of 79° or greater, exhibiting water repellency. The anode diffusion layers subjected to hydrophilization treatment, on the other hand, had a contact angle of 20° or less in the initial stage and exhibited hydrophilic property, but the hydrophilic property reduced gradually.

(7) Measurement of Foam Discharging Performance, Internal Pressure and Output Voltage of Fuel Cell (DMFC) Power Source System A fuel cell power source system as illustrated in FIG. 1 was manufactured using the MEA and cathode prepared above in (5) together with the diffusion layer prepared above in (6). A cartridge filled with a 20 wt. % aqueous methanol solution was attached to the system and the system was operated for about 30 minutes at a load current density of 50 mA/cm$^2$. At the time, the foam discharging performance from the fuel tank in the fuel cell was visually observed, and the pressure in the fuel tank and output voltage were measured. The results are shown in Table 1. The system showed good foam discharging performance in the initial stage, did not show an increase in the internal pressure and had an output voltage of 1.4V or greater.

Anode diffusion layers dipped in a 20 wt. % aqueous methanol solution of 60° C. for 2 days, 15 days and 60 days were used to manufacture a fuel cell power source system of FIG. 1. A cartridge filled with a 20 wt. % aqueous methanol solution was attached to the system and the system was operated for about 30 minutes at a load current density of 50 mA/cm$^2$. At the time, the foam discharging performance from the fuel tank in the fuel cell was visually observed, and the pressure in the fuel tank and output voltage were measured. The results are shown in Table 1. As the immersion time in methanol became longer, the anode diffusion layer had more deteriorated hydrophilic property, increased internal pressure and deteriorated output voltage. Table 1 shows that the hydrophilization treatment (4) is excellent as the treatment of an anode diffusion layer.

Comparative Example 1

(1) Preparation of Electrolyte Membrane Electrode Assembly (MEA)

An electrolyte membrane electrode assembly (MEA) was prepared in a similar manner to Example 1 except that an anode electrode hydrolyzed by dissolving, in a slurry of 50 wt. % of 1/1 (atomic ratio) platinum/ruthenium alloy fine particles dispersed and borne on a carbon carrier and the 30 wt. % sulfomethylated polyethersulfone obtained above in (3) in a mixed solvent of 1-propanol, 2-propanol and methoxyethanol, polyoxyalkylene glycol and 3-heptanol to give them 0.01 wt. % and 0.05 wt. %, respectively.

(2) Preparation of Anode Diffusion Layer (0)

An untreated carbon cloth having a thickness of about 350 μm and porosity of 87% was dipped in ethyl alcohol in which polyoxyalkylene glycol and 3-heptanol had been dissolved to give their concentrations of 0.01 wt. % and 0.05 wt. %, respectively, followed by drying. The resulting cloth was cut into an equal size of the electrode of the above-described MEA to prepare a cathode diffusion layer (D) of Comparative Example 1 subjected to hydrophilization treatment (0).

(3) Measurement of Contact Angle, Foam Discharging Performance, Internal Pressure and Output Voltage Anode diffusion layers subjected to water repellent treatment and hydrophilization treatment (0) were each immersed in a 20 wt. % aqueous methanol solution contained in a Teflon (trade mark) vessel and the vessel was put in a SUS pressure container. The pressure container was allowed to stand in a thermostat bath of 60° C. The samples were taken out after, 2 days, 15 days and 60 days, respectively and wiped gently with "Kimwipe". The contact angle with water was then measured using a contact angle meter "CA-D" (trade name) manufactured by Kyowa Interface Science. As a result, as shown in Comparative Example in Table 1, the anode diffusion layer subjected to water repellent treatment had a contact angle of 79° or greater, exhibiting water repellency. The anode diffusion layer subjected to hydrophilization treatment, on the other hand, had a contact angle of 20° or less in the initial stage and exhibited hydrophilic property. Immersion in a 20 wt. % aqueous methanol solution only for 2 days however caused a drastic increase in the contact angle, suggesting weakening of hydrophilic property.

A fuel cell power source system as illustrated in FIG. 1 was manufactured using the MEA manufactured in (5) of Example 1 or Comparative Example 1, the diffusion layer prepared above in (6) for the cathode, and a diffusion layer subjected to water repellent treatment or the anode diffusion layer (0) prepared above in (2) for the anode. A cartridge filled with a 20 wt. % aqueous methanol solution was attached to the system and the system was operated for about 30 minutes at a load current density of 50 mA/cm$^2$. At the time, the foam discharging performance from the fuel tank in the fuel cell was visually observed, and the pressure in the fuel tank and output voltage were measured. The results are shown in Table 1. The diffusion layer (A) to which no defoaming agent had been added showed poor foam discharging performance even from the initial stage and had high internal pressure. Its output voltage was very small. In (B), (C) and (D) where a defoaming agent was added to the electrode, the foam discharging performance was good not only in the initial stage, did not show any increase in internal pressure and showed output voltage of 1.4 V or greater. Immersion in a 20 wt. % aqueous methanol solution for 2 days however drastically deteriorated the foam discharging performance and increased internal pressure, resulting in that the system became unusable.

Examples (A) to (E) and Comparative Examples (A) to (D) in Tables 1 and 2 have revealed that an anode diffusion layer subjected to hydrophilization treatment shows good foam discharging performance for long hours, does not show any increase in internal pressure which permits smooth supply of fuel, and therefore enables power generation. In particular, hydrophilization treatment including reaction with a diffusion layer is superior.

TABLE 1

| | | Comparative Example 1 | | | |
|---|---|---|---|---|---|
| | | (A) Water repellent treatment | (B) Water repellent treatment *1 | (C) Water repellent treatment *2 | (D) Treatment with defoaming agent *3 |
| Treatment of diffusion layer | | | | | |
| Initial stage | Contact angle | 81 | 79 | 80 | <20 |
| | Foam discharging performance | C | A | A | A |
| | Internal pressure (kPa) | 50-55 | 21-23 | 21-23 | 21-23 |
| | Output voltage (V) | 0.1-0.3 | 1.40-1.60 | 1.40-1.60 | 1.40-1.60 |
| Treatment with 20 wt. % aqueous methanol solution of 60° C. for 2 days | Contact angle | 85 | 80 | 81 | 35 |
| | Foam discharging performance | C | C | C | A-C |
| | Internal pressure (kPa) | 55-60 | 45-55 | 50-55 | 20-60 |
| | Output voltage (V) | 0.01-1.20 | 0.1-1.4 | 0.1-1.5 | 0.3-1.60 |
| Treatment with 20 wt. % aqueous methanol solution of 60° C. for 15 days | Contact angle | | 83 | 83 | 50 |
| | Foam discharging performance | | C | C | C |
| | Internal pressure (kPa) | | 55-60 | 55-60 | 55-60 |
| | Output voltage (V) | | 0.01-1.20 | 0.01-1.20 | 0.01-1.20 |
| Treatment with 20 wt. % aqueous methanol solution of 60° C. for 60 days | Contact angle | | | | |
| | Foam discharging performance | | | | |
| | Internal pressure (kPa) | | | | |
| | Output voltage (V) | | | | |

(B): water repellent treatment *1: combination of an electrode treated with a defoaming agent and an anode diffusion layer subjected to water repellent treatment
(C) Water repellent treatment *2: combination of an electrode containing a carbonate ion trapping agent and an anode diffusion layer subjected to water repellent treatment
(D) Treatment with defoaming agent *3: electrode and anode diffusion layer both treated with a defoaming agent

TABLE 2

| | | Example 1 | | | | |
|---|---|---|---|---|---|---|
| | | (A) No treatment | (B) Hydrophilization treatment (1) | (C) Hydrophilization treatment (2) | (D) Hydrophilization treatment (3) | (E) Hydrophilization treatment (4) |
| Treatment of diffusion layer | | | | | | |
| Initial stage | Contact angle | 45 | <20 | <20 | <20 | <20 |
| | Foam discharging performance | A | A | A | A | A |
| | Internal pressure (kPa) | 21-23 | 21-23 | 21-23 | 21-23 | 21-23 |
| | Output voltage (V) | 1.45-1.60 | 1.40-1.60 | 1.60-2.10 | 1.40-1.60 | 1.60-2.10 |
| Treatment with 20 wt. % aqueous methanol solution of 60° C. for 2 days | Contact angle | 45-50 | <20 | <20 | <20 | <20 |
| | Foam discharging performance | 45-50 | A-B | A-B | A-B | A-B |
| | Internal pressure (kPa) | 20-40 | 20-40 | 20-40 | 21-45 | 21-40 |
| | Output voltage (V) | 1.2-1.60 | 1.2-1.60 | 1.2-1.60 | 1.2-1.60 | 1.45-1.60 |
| Treatment with 20 wt. % aqueous methanol solution of 60° C. for 15 days | Contact angle | 50-65 | 24-46 | 25-35 | 20-25 | 20-40 |
| | Foam discharging performance | B-C | A-B | A-B | A-B | A-B |
| | Internal pressure (kPa) | 21-55 | 21-23 | 21-23 | 21-23 | 21-23 |
| | Output voltage (V) | 0.50-1.30 | 1.2-1.60 | 1.3-1.60 | 1.2-1.60 | 1.25-1.60 |
| Treatment with 20 wt. % aqueous methanol solution of 60° C. for 60 days | Contact angle | 60-75 | 54-56 | 25-35 | 20-25 | 20-40 |
| | Foam discharging performance | C | B-C | B-C | B-C | A-B |
| | Internal pressure (kPa) | 55-60 | 21-60 | 25-55 | 24-60 | 21-55 |
| | Output voltage (V) | 0.01-1.20 | 0.15-1.40 | 0.12-1.40 | 0.13-1.40 | 1.40-1.60 |

Example 2

(1) Manufacture of Anode Endplate and Current Collector

Anode endplates and current collectors were manufactured by changing the short side/long side ratio of slits 122, 122a, 122b and 122c serving as transmission holes of fuel and carbon dioxide gas to 0.2, 0.36, 0.5, 0.8 and 1.0. The anode endplate and current collector were bonded and integrated by an epoxy resin. In addition, anode endplates and current collectors were manufactured by changing angles between the surface of the anode electrode and slits 122, 122a, 122b and 122c extending from the electrode toward the fuel tank to 90°, 85°, 80° and 70°, while fixing the short side/long side ratio to 0.36. The anode endplates and current collectors were bonded and integrated by an epoxy resin.

(2) Measurement of Contact Angle

The anode endplates integrated with the current collectors manufactured above in (1) were immersed in a 20 wt. % aqueous methanol solution contained in a Teflon (trade mark) vessel and the vessel was put in a SUS pressure container. The pressure container was allowed to stand in a thermostat bath of 60° C. The samples were taken out after 2 days, 15 days and 60 days, respectively and wiped gently with "Kimwipe". The contact angle with water was then measured using a contact angle meter "CA-D" (trade name) manufactured by Kyowa Interface Science. As a result, any of these anode endplates integrated with the current collectors showed a contact angle of 70° or greater as shown in Examples in Tables 3 and 4.

TABLE 3

|  |  | Example 2 | | | | |
| --- | --- | --- | --- | --- | --- | --- |
|  |  | (A) | (B) | (C) | (D) | (E) |
|  |  | A short side/long side ratio changed | | | | |
| A short side/long side ratio or angle of inclination | | 1.00 | 0.95 | 0.90 | 0.30 | 0.20 |
| Initial stage | Contact angle | 81 | 82 | 81 | 81 | 81 |
|  | Foam discharging performance | C | A | A | A | A |
|  | Internal pressure (kPa) | 50-55 | 21-23 | 21-23 | 21-23 | 21-23 |
|  | Output voltage (V) | 0.1-1.3 | 1.40-1.60 | 1.40-1.60 | 1.45-1.60 | 1.40-1.60 |
| Treatment with 20 wt. % aqueous methanol solution of 60° C. for 2 days | Contact angle | 85 | 81 | 80 | 81 | 80 |
|  | Foam discharging performance | C | A-B | A-B | A-B | A-B |
|  | Internal pressure (kPa) | 55-60 | 20-60 | 20-60 | 20-60 | 21-45 |
|  | Output voltage (V) | 0.01-1.20 | 1.2-1.60 | 1.2-1.60 | 1.2-1.60 | 1.2-1.60 |
| Treatment with 20 wt. % aqueous methanol solution of 60° C. for 15 days | Contact angle |  | 80 | 80 | 81 | 80 |
|  | Foam discharging performance |  | B-C | B-C | B-C | B-C |
|  | Internal pressure (kPa) |  | 21-60 | 20-60 | 20-60 | 20-60 |
|  | Output voltage (V) |  | 0.15-1.40 | 0.12-1.20 | 0.15-1.15 | 0.09-1.1 |

TABLE 4

|  |  | Example 2 | | | |
| --- | --- | --- | --- | --- | --- |
|  |  | (F) | (G) | (H) | (I) |
|  |  | Angle of inclination changed | | | |
| Short side/long side ratio or angle of inclination | | 90° | 85° | 80° | 60° |
| Initial stage | Contact angle | 72 | 71 | 72 | 70 |
|  | Foam discharging performance | A | A | A | A |
|  | Internal pressure (kPa) | 21-23 | 21-23 | 21-23 | 21-23 |
|  | Output voltage (V) | 1.40-1.60 | 1.40-1.60 | 1.40-1.60 | 1.40-1.60 |
| Treatment with 20 wt. % aqueous methanol solution of 60° C. for 2 days | Contact angle | 72 | 71 | 72 | 70 |
|  | Foam discharging performance | A-B | A-B | A-B | A-B |
|  | Internal pressure (kPa) | 21-40 | 21-40 | 21-40 | 21-40 |
|  | Output voltage (V) | 1.45-1.60 | 1.45-1.60 | 1.45-1.60 | 1.45-1.60 |
| Treatment with 20 wt. % aqueous methanol solution of 60° C. for 15 days | Contact angle | 72 | 72 | 72 | 72 |
|  | Foam discharging performance | B-C | B-C | B-C | B-C |
|  | Internal pressure (kPa) | 20-60 | 20-60 | 20-60 | 20-60 |
|  | Output voltage (V) | 0.09-1.1 | 0.09-1.1 | 0.09-1.1 | 0.09-1.1 |

A short side/long side ratio: A short side/long side ratio of slits (fuel transmission holes) 122, 122a, 122b, 122c Angle of inclination: Angle of inclinations of slits (fuel transmission holes) 122, 122a, 122b and 122c extending from the anode electrode side to the outside (3) Measurement of Foam Discharging Performance, Internal Pressure and Output Voltage of Fuel Cell (DMFC) Power Source System A fuel cell power source system of FIG. 1 was manufactured using the anode endplate integrated with the current collector manufactured in (1). A cartridge filled with a 20 wt. % aqueous methanol solution was attached to the system. The resulting system was operated for about 30 minutes at a load current density of 50 mA/cm$^2$. The foam discharging performance was visually observed, and the pressure in the fuel tank and output voltage were measured. The results are shown in Tables 3 and 4.

In the initial stage, all the systems except that with a slit hole having a short side/long side ratio of 1.0 showed good foam discharging performance, did not show an increase in internal pressure and had an output voltage of 1.4V or greater. The system with a slit hole having a short side/long side ratio of 1.0 was inferior in foam discharging performance, and showed an increase in internal pressure and unstable output voltage. The short side/long side ratio is preferably not 1.0, meaning that the vertical length differs with the horizontal length. From the standpoint of foam discharging performance, the short side/long side ratio of the slit hole of the anode endplate integrated with current collector is preferably other than 1.0. The short side/long side ratio is desirably adjusted to from 0.2 to 0.8, more preferably from 0.3 to 0.6.

With regards to the angle between the surface of the anode electrode and the slits 122, 122a, 122b and 122c of the anode endplate integrated with current collector extending from the electrode side toward the fuel tank, when it is 90°, the system showed poor foam discharging performance, high internal pressure and unstable output voltage. When the inclination angle of the slit of the anode endplate integrated with current collecting plate is set at 85°, 80° or 70° so as to make it wider from the anode diffusion layer side toward the air layer side, the foam discharging performance is improved, an increase in internal pressure becomes small and output voltage becomes stable.

The above-described findings suggest that by adjusting the short side/long side ratio of the slit of the anode endplate integrated with current collector to other than 1 and inclining the slit of the anode endplate integrated with current collector to be wider from the anode diffusion layer side to the air layer side, a gas can be discharged from the anode endplate integrated with current collector promptly, an increase in internal pressure can be suppressed and a high output voltage can be maintained stably for a long period of time.

Example 3

Anode endplates integrated with current collector subjected to UV/ozone treatment for 20 minutes, excimer laser treatment for 5 minutes, 10 minutes, 20 minutes or 30 minutes, or oxygen plasma treatment for 10 seconds were immersed in a 20 wt. % aqueous methanol solution contained in a Teflon (trade mark) vessel. The vessel was then put in an SUS pressure container. The pressure container was allowed to stand in a thermostat bath of 60° C. The anode endplates integrated with current collector were taken out after 2 days, 15 days and 60 days, respectively and wiped gently with "Kimwipe". The contact angle with water was then measured using a contact angle meter "CA-D" (trade name) manufactured by Kyowa Interface Science. Results are shown in Tables 5 and 6. The anode endplates integrated with current collector subjected to UV/ozone treatment or oxygen plasma treatment had a contact angle of from 17 to 19°, while the anode endplates integrated with current collector subjected to excimer laser treatment had a contact angle of from 45 to 47°. Immersion in a 20 wt. % aqueous methanol solution of 60° C. gradually increases the contact angle of each of the anode endplates integrated with current collector subjected to UV/ozone treatment, oxygen plasma treatment or excimer laser treatment. This phenomenon is presumed to occur because when they were immersed in a 20 wt. % aqueous methanol solution for long hours, transfer of the hydrophilic group on the surface of the anode endplate such as carbonyl, carboxyl or hydroxyl group to the inside of the endplate occurs, leading to a decrease in hydrophilic property on the surface of the anode endplate. When the influence of exposure time of the anode endplates integrated with current collector subjected to excimer laser treatment was investigated, the longer the exposure time, the smaller an increase in the contact angle even if the plate was immersed in a 20 wt. % aqueous methanol solution of 60° C. for long hours. This phenomenon is presumed to occur because even if a hydrophilic group such as carbonyl, carboxyl or hydroxyl group on the surface of the anode endplate transfers inside of the endplate, a hydrophilic group such as carbonyl, carboxyl or hydroxyl group has already been introduced into a deeper portion of the anode endplate as the exposure time is longer and it is not lost from the surface.

A fuel cell power source system of FIG. 1 was manufactured using the anode endplate integrated with current collector subjected to UV/ozone treatment, excimer laser treatment or oxygen plasma treatment. A cartridge filled with a 20 wt. % aqueous methanol solution was attached to the system. The resulting system was operated for about 30 minutes at a load current density of 50 mA/cm$^2$. The foam discharging performance of the fuel tank in the fuel cell was visually observed, and the pressure in the fuel tank and output voltage were measured. The results are shown in Tables 5 and 6.

Compared with the anode endplate integrated with current collector subjected to no treatment, the above-described ones each showed good foam discharging performance, did not show an increase in internal pressure and exhibited stable output. Immersion of the anode endplate integrated with current collector subjected to UV/ozone treatment, oxygen plasma treatment or excimer laser treatment in a 20 wt. % aqueous methanol solution of 60° C. caused gradual deterioration in the foam discharging performance, increase in the pressure in the DMFC and unstable output voltage. This phenomenon is presumed to occur because immersion in a 20 wt. % aqueous methanol solution of 60° C. causes transfer of the hydrophilic group such as carbonyl group, carboxyl group or hydroxyl group from the surface of the endplate to the inside of the endplate, which causes reduction in hydrophilicity on the surface of the anode endplate.

When the exposure time is longer, the anode endplate integrated with current collector shows better foam discharging performance, does not show an increase in internal pressure and has more stable output voltage even if it is immersed in a 20 wt. % aqueous methanol solution of 60° C. This phenomenon is presumed to occur because even if a hydrophilic group such as carbonyl, carboxyl or hydroxyl group on the surface of the anode endplate transfers inside of the endplate, a hydrophilic group such as carbonyl, carboxyl or hydroxyl group has already been introduced into a deeper portion of the anode endplate as the exposure time is longer and it is not lost from the surface.

As can be understood from Tables 5 and 6, compared with the anode endplate integrated with current collector subjected to no treatment, the anode endplate integrated with current collector having a hydrophilic group such as carbonyl, carboxyl or hydroxyl group introduced therein by hydrophilization treatment with UV/ozone, excimer laser, oxygen plasma, corona discharge, electron beam or radiation can promptly discharge a gas such as carbon dioxide gas generated at the anode, prevents an increase an internal pressure and produces high output voltage stably.

TABLE 5

| | | Non-treatment | (A) UV ozone treatment | (B) Excimer for 5 minutes | (C) Excimer for 10 minutes |
|---|---|---|---|---|---|
| | | | Example 3 | | |
| Initial stage | Contact angle | 81 | 17-19 | 45-47 | 45-47 |
| | Foam discharging performance | C | A | A | A |
| | Internal pressure (kPa) | 50-55 | 21-23 | 21-23 | 21-23 |
| | Output voltage (V) | 0.1-1.3 | 1.14-1.32 | 1.20-1.60 | 1.40-1.60 |
| Treatment with 20 wt. % aqueous methanol solution of 60° C. for 2 days | Contact angle | 85 | 38-48 | 75-81 | 50-65 |
| | Foam discharging performance | C | B-C | C | B-C |
| | Internal pressure (kPa) | 55-60 | 20-48 | 50-55 | 21-55 |
| | Output voltage (V) | 0.01-1.20 | 0.16-0.55 | 0.1-1.5 | 0.50-1.30 |
| Treatment with 20 wt. % aqueous methanol solution of 60° C. for 15 days | Contact angle | | 80 | 83 | 50-65 |
| | Foam discharging performance | | C | C | B-C |
| | Internal pressure (kPa) | | 45-55 | 55-60 | 21-55 |
| | Output voltage (V) | | 0.1-0.8 | 0.01-0.9 | 0.50-1.20 |

TABLE 6

| | | (D) Excimer, 20 min. | (E) Excimer, 30 min. | (G) Excimer, 60 min. | (H) Oxygen plasma treatment |
|---|---|---|---|---|---|
| | | | Example 3 | | |
| Initial stage | Contact angle | 45-47 | 45-47 | 45-47 | 17-19 |
| | Foam discharging performance | A | A | A | A |
| | Internal pressure (kPa) | 21-23 | 21-23 | 21-23 | 21-23 |
| | Output voltage (V) | 1.40-1.60 | 1.45-1.60 | 1.40-1.60 | 1.20-1.60 |
| Treatment with 20 wt. % aqueous methanol solution of 60° C. for 2 days | Contact angle | 45-65 | 45-50 | 45-50 | 75-81 |
| | Foam discharging performance | A-B | A-B | A-B | C |
| | Internal pressure (kPa) | 21-25 | 21-25 | 21-25 | 50-55 |
| | Output voltage (V) | 1.0-1.60 | 1.2-1.60 | 1.2-1.60 | 0.1-1.5 |
| Treatment with 20 wt. % aqueous methanol solution of 60° C. for 15 days | Contact angle | 45-65 | 45-60 | 45-50 | |
| | Foam discharging performance | B-C | B-C | A-B | |
| | Internal pressure (kPa) | 21-55 | 21-55 | 21-25 | |
| | Output voltage (V) | 0.50-1.20 | 0.50-1.30 | 1.2-1.60 | |

Example 4

An anode endplate integrated with current collector was sandblasted with alumina having a grain size of each of #1200, #800, #600, #320, #150 and #60 under the conditions of gun diameter of 9 mm, gun distance of 100 mm and gun moving speed of 50 mm/sec at an injection pressure of each of 0.2 MPa, 0.3 MPa and 0.4 MPa.

The above-described sandblasted anode endplates integrated with current collector were immersed in a 20 wt. % aqueous methanol solution contained in a Teflon (trade mark) vessel and the vessel was put in a SUS pressure container. The pressure container was allowed to stand in a thermostat bath of 60° C. The anode endplates integrated with current collector were taken out after 2 days, 15 days and 60 days, respectively and wiped gently with "Kimwipe". Each contact angle of the plates with water was then measured using a contact angle meter "CA-D" (trade name) manufactured by Kyowa Interface Science. As a result, as shown in Example in Table 7, it falls within a range of from 70° to 76° and no change was recognized even by immersion in a 20 wt. % aqueous methanol solution of 60° C.

A fuel cell power source system of FIG. 1 was manufactured using the above-described sandblasted anode endplate integrated with current collector. A cartridge filled with a 20 wt. % aqueous methanol solution was attached to the system. The resulting system was operated for about 30 minutes at a load current density of 50 mA/cm². The foam discharging performance of the fuel tank in the fuel cell was visually observed, and the pressure in the fuel tank and output voltage were measured. The results are shown in Tables 7, 8, 9 and 10. Compared with the anode endplate integrated with current collector subjected to no treatment, the above-described ones except the plate (P) showed good results in the initial stage. The greater the number of the grain size and the lower the discharge pressure, the better the results. When the anode endplate integrated with current collector is immersed in a 20 wt. % aqueous solution of 60° C. for longer hours, it showed worse foam discharging performance, had higher pressure in DMFC and had less uniform output voltage. Compared with the treatment-free plate in Comparative Example, any of the plates in Example 4 showed better foam discharging performance, less increase in internal pressure and more stable output voltage. The anode endplate integrated with current collector subjected to physical roughening treatment by sandblasting can promptly discharge a gas therefrom, prevent an increase in internal pressure and produce high output voltage stably. The results are shown in Tables 7, 8, 9 and 10.

TABLE 7

|  |  | Comp. Ex. 1 No treatment | Example 4 | | | |
|---|---|---|---|---|---|---|
|  |  |  | (A) #1200, 0.2 MPa | (B) #1200, 0.3 MPa | (C) #1200, 0.4 MPa | (D) #800, 0.2 MPa |
| Initial stage | Contact angle | 81 | 75 | 73 | 72 | 70 |
|  | Foam discharging performance | C | A | A-B | B | A |
|  | Internal pressure (kPa) | 50-55 | 21-23 | 21-28 | 24-28 | 21-23 |
|  | Output voltage (V) | 0.1-1.3 | 1.4-1.7 | 1.0-1.7 | 1.0-1.2 | 1.4-1.7 |
| Treatment with 20 wt. % aqueous methanol solution of 60° C. for 2 days | Contact angle | 85 | 75 | 75 | 73 | 72 |
|  | Foam discharging performance | C | B-C | B-C | B-C | B |
|  | Internal pressure (kPa) | 55-60 | 20-28 | 20-60 | 20-60 | 21-45 |
|  | Output voltage (V) | 0.01-1.20 | 0.16-0.55 | 0.12-1.20 | 0.15-1.15 | 1.12-1.20 |
| Treatment with 20 wt. % aqueous methanol solution of 60° C. for 15 days | Contact angle |  | 75 | 75 | 74 | 73 |
|  | Foam discharging performance |  | B-C | B-C | C | B-C |
|  | Internal pressure (kPa) |  | 20-60 | 20-60 | 55-60 | 20-60 |
|  | Output voltage (V) |  | 0.16-0.55 | 0.16-0.85 | 0.01-0.32 | 0.25-1.50 |
| Treatment with 20 wt. % aqueous methanol solution of 60° C. for 60 days | Contact angle |  | 76 | 76 |  | 74 |
|  | Foam discharging performance |  | C | C |  | C |
|  | Internal pressure (kPa) |  | 55-60 | 55-60 |  | 55-60 |
|  | Output voltage (V) |  | 0.01-1.20 | 0.01-1.20 |  | 0.01-1.20 |

TABLE 8

|  |  | Example 4 | | | | |
|---|---|---|---|---|---|---|
|  |  | (E) #800, 0.3 MPa | (F) #800, 0.4 MPa | (G) #600, 0.2 MPa | (H) #600, 0.3 MPa | (I) #600, 0.4 MPa |
| Initial stage | Contact angle | 71 | 73 | 74 | 75 | 74 |
|  | Foam discharging performance | A | B | A | A-B | B |
|  | Internal pressure (kPa) | 21-23 | 21-23 | 21-23 | 21-23 | 21-23 |
|  | Output voltage (V) | 1.4-17 | 0.9-1.2 | 1.4-1.7 | 0.8-1.7 | 0.8-1.3 |
| Treatment with 20 wt. % aqueous methanol solution of 60° C. for 2 days | Contact angle | 70 | 71 | 73 | 74 | 75 |
|  | Foam discharging performance | B | B-C | B | B-C | B-C |
|  | Internal pressure (kPa) | 21-40 | 20-60 | 21-40 | 20-60 | 20-60 |
|  | Output voltage (V) | 0.95-1.15 | 0.15-1.15 | 0.85-1.15 | 0.15-1.15 | 0.15-1.15 |
| Treatment with 20 wt. % aqueous methanol solution of 60° C. for 15 days | Contact angle | 73 | 74 | 73 | 73 | 74 |
|  | Foam discharging performance | B-C | C | B-C | B-C | C |
|  | Internal pressure (kPa) | 20-60 | 55-60 | 20-60 | 20-60 | 55-60 |
|  | Output voltage (V) | 0.15-1.15 | 0.01-1.20 | 0.15-1.15 | 0.15-1.15 | 0.01-1.20 |
| Treatment with 20 wt. % aqueous methanol solution of 60° C. for 60 days | Contact angle | 74 |  | 74 | 74 |  |
|  | Foam discharging performance | C |  | C | C |  |
|  | Internal pressure (kPa) | 55-60 |  | 55-60 | 55-60 |  |
|  | Output voltage (V) | 0.01-1.20 |  | 0.01-1.20 | 0.01-1.20 |  |

TABLE 9

|  |  | Example 4 | | | | |
|---|---|---|---|---|---|---|
|  |  | (J) #320, 0.2 MPa | (K) #320, 0.3 MPa | (L) #320, 0.4 MPa | (M) #150, 0.2 MPa | (N) #150, 0.3 MPa |
| Initial stage | Contact angle | 73 | 75 | 76 | 74 | 72 |
|  | Foam discharging performance | A-B | A-B | B | A-B | B |
|  | Internal pressure (kPa) | 21-23 | 21-23 | 21-23 | 21-23 | 21-23 |
|  | Output voltage (V) | 1.4-1.7 | 1.4-1.7 | 1.1-1.7 | 0.9-1.7 | 0.9-1.2 |
| Treatment with 20 wt. % aqueous methanol solution of 60° C. for 2 days | Contact angle | 73 | 75 | 76 | 74 | 72 |
|  | Foam discharging performance | B | B | B-C | B-C | B-C |
|  | Internal pressure (kPa) | 21-45 | 21-40 | 20-60 | 20-60 | 20-60 |
|  | Output voltage (V) | 0.12-1.20 | 0.8-1.15 | 0.75-1.20 | 0.12-1.20 | 0.15-1.15 |
| Treatment with 20 wt. % aqueous methanol solution of 60° C. for 15 days | Contact angle | 75 | 75 | 74 | 75 | 75 |
|  | Foam discharging performance | B-C | B-C | C | B-C | B-C |
|  | Internal pressure (kPa) | 20-60 | 20-60 | 55-60 | 20-60 | 20-60 |
|  | Output voltage (V) | 0.16-0.75 | 0.16-0.85 | 0.01-1.20 | 0.16-0.85 | 0.16-0.75 |

TABLE 9-continued

| | | Example 4 | | | | |
|---|---|---|---|---|---|---|
| | | (J) #320, 0.2 MPa | (K) #320, 0.3 MPa | (L) #320, 0.4 MPa | (M) #150, 0.2 MPa | (N) #150, 0.3 MPa |
| Treatment with 20 wt. % aqueous methanol solution of 60° C. for 60 days | Contact angle | 76 | 76 | | 76 | 76 |
| | Foam discharging performance | C | C | | C | C |
| | Internal pressure (kPa) | 55-60 | 55-60 | | 55-60 | 55-60 |
| | Output voltage (V) | 0.01-1.20 | 0.01-1.20 | | 0.01-1.20 | 0.01-1.20 |

TABLE 10

| | | Example 4 | | | |
|---|---|---|---|---|---|
| | | (O) #150, 0.4 MPa | (P) #60, 0.2 MPa | (Q) #60, 0.3 MPa | (R) #60, 0.4 MPa |
| Initial stage | Contact angle | 70 | 76 | 75 | 74 |
| | Foam discharging performance | B | C | B | B |
| | Internal pressure (kPa) | 21-23 | 21-23 | 21-23 | 21-23 |
| | Output voltage (V) | 0.8-1.2 | 0.4-0.5 | 0.9-1.3 | 0.8-1.2 |
| Treatment with 20 wt. % aqueous methanol solution of 60° C. for 2 days | Contact angle | 70 | | 75 | 74 |
| | Foam discharging performance | B | | B-C | B-C |
| | Internal pressure (kPa) | 21-40 | | 20-60 | 20-60 |
| | Output voltage (V) | 0.75-1.15 | | 0.15-1.15 | 0.15-1.15 |
| Treatment with 20 wt. % aqueous methanol solution of 60° C. for 15 days | Contact angle | 74 | | 74 | 74 |
| | Foam discharging performance | C | | C | C |
| | Internal pressure (kPa) | 55-60 | | 55-60 | 55-60 |
| | Output voltage (V) | 0.01-1.20 | | 0.01-1.20 | 0.01-1.20 |
| Treatment with 20 wt. % aqueous methanol solution of 60° C. for 60 days | Contact angle | | | | |
| | Foam discharging performance | | | | |
| | Internal pressure (kPa) | | | | |
| | Output voltage (V) | | | | |

Example 5

(1) Preparation of Hydrophilic Film Forming Coating

To 297 parts by weight of tetrahydrofuran (THF) was added 1 part by weight of polyethylene glycol having an average molecular weight of 6,000. The resulting mixture was stirred under heating to 50° C. to prepare the corresponding solution. To the resulting solution were added 2 parts by weight of "Sila-Ace S310", "S320", "S330", "S360", "MS3201" and "MS3301" (each, trade name; product of Chisso Corporation) having both an amino group and an alkoxysilane residue, followed by stirring to yield hydrophilic film forming coatings (A), (B), (C), (D), (E) and (F), respectively. In addition, 1 part by weight of polyethylene glycol having an average molecular weight of 2,000,000 was added to 297 parts by weight of tetrahydrofuran (THF). The resulting mixture was stirred under heating to 50° C. to prepare the corresponding solution. To the resulting solution were added 2 parts by weight of "Sila-Ace S310", "S320", and "MS3301" (each, trade name; product of Chisso Corporation) having both an amino group and an alkoxysilane residue, followed by stirring to yield hydrophilic film forming coatings (G), (H) and (I), respectively.

(3) Chemical Hydrophilic Treatment of Anode Endplate Integrated with Current Collector The current collector portions of the anode endplates integrated with current collector were masked with a masking tape, followed by oxygen/plasma treatment for 10 seconds. Then, the resulting plates were immersed in the above-described hydrophilic film forming coatings (A) to (I), respectively, for 30 seconds. After taken out from the coatings, they were heated to 110° C. for about 30 seconds to form a hydrophilic film on the surface of the anode endplates.

(4) Measurement of Contact Angle

The anode endplates integrated with current collector manufactured in (2) were immersed in a 20 wt. % aqueous methanol solution contained in a Teflon (trade mark) vessel and the vessel was put in a SUS pressure container. The pressure container was allowed to stand in a thermostat bath of 60° C. The resulting anode endplates integrated with current collector were taken out after 2 days, 15 days and 60 days, respectively and wiped gently with "Kimwipe". The contact angle with water was then measured using a contact angle meter "CA-D" (trade name) manufactured by Kyowa Interface Science. As a result, as illustrated in Table 5, the plates had a contact angle of 20° or less, exhibited high hydrophilic property and were stable even if they were immersed in a 20 wt. % aqueous methanol solution of 60° C. for long hours.

(5) Measurement of Foam Discharging Performance, Internal Pressure and Output Voltage of Fuel Cell (DMFC) Power Source System Fuel cell power source systems as illustrated in FIG. 1 were manufactured using the above-described anode endplates integrated with current collector. A cartridge filled with a 20 wt. % aqueous methanol solution was attached to these systems and the systems were operated for about 30 minutes at a load current density of 50 mA/cm$^2$. At the time, the foam discharging performance from the fuel tank in the fuel cell was visually observed, and the pressure in the fuel tank and output voltage were measured. The results are shown in Tables 11 and 12.

TABLE 11

|  |  | Comp. Ex. | Example 5 | | | |
|---|---|---|---|---|---|---|
|  |  | No treatment | (A) | (B) | (C) | (D) |
| Initial stage | Contact angle | 81 | <20 | <20 | <20 | <20 |
|  | Foam discharging performance | C | A | A | A | A |
|  | Internal pressure (kPa) | 50-55 | 21-23 | 21-23 | 21-23 | 21-23 |
|  | Output voltage (V) |  | 1.7-2.1 | 1.7-2.1 | 1.7-2.1 | 1.7-2.1 |
| Treatment with 20 wt. % aqueous methanol solution of 60° C. for 2 days | Contact angle | 85 | <20 | <20 | <20 | <20 |
|  | Foam discharging performance | C | A | A | A | A |
|  | Internal pressure (kPa) | 55-60 | 21-23 | 21-23 | 21-23 | 21-23 |
|  | Output voltage (V) |  | 1.7-2.1 | 1.7-2.1 | 1.7-2.1 | 1.7-2.1 |
| Treatment with 20 wt. % aqueous methanol solution of 60° C. for 15 days | Contact angle |  | <20 | <20 | <20 | <20 |
|  | Foam discharging performance |  | A | A | A | A |
|  | Internal pressure (kPa) |  | 21-23 | 21-23 | 21-23 | 21-23 |
|  | Output voltage (V) |  | 1.7-2.1 | 1.7-2.1 | 1.7-2.1 | 1.7-2.1 |
| Treatment with 20 wt. % aqueous methanol solution of 60° C. for 60 days | Contact angle |  | <20 | <20 | <20 | <20 |
|  | Foam discharging performance |  | A | A | A | A |
|  | Internal pressure (kPa) |  | 21-23 | 21-23 | 21-23 | 21-23 |
|  | Output voltage (V) |  | 1.7-2.1 | 1.7-2.1 | 1.7-2.1 | 1.7-2.1 |

TABLE 12

|  |  | Example 5 | | | | |
|---|---|---|---|---|---|---|
|  |  | (E) | (F) | (G) | (H) | (I) |
| Initial stage | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 2 days | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 15 days | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 60 days | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |

The fuel cell power source system using the anode endplate integrated with current collector showed good foam discharging performance, no increase in internal pressure and stable output voltage of 1.7V or greater in the initial stage and 60 days after immersion in a 20 wt. % aqueous methanol solution of 60° C.

The above-described finding suggests that application of a reactive hydrophilic coating to the surface of an anode endplate integrated with current collector enables prompt discharge of a gas such as carbon dioxide gas generated at the anode electrode portion, prevention of an increase in internal pressure and supply of a high output voltage stably for a prolonged period of time.

Example 6

(1) Preparation of Hydrophilic Film Forming Coating

To 297 parts by weight of tetrahydrofuran (THF) was added 1 part by weight of polyethylene glycol having an average molecular weight of 8,000. The resulting mixture was stirred under heating to 50° C. to prepare the corresponding solution. To the resulting solution were added 2 parts by weight of "Sila-Ace S310", "S320", "S330", "S360", "MS3201" and "MS3301" (each, trade name; product of Chisso Corporation) having both an amino group and an alkoxysilane residue, followed by stirring to yield hydrophilic film forming coatings (A), (B), (C), (D), (E) and (F), respectively. In addition, 1 part by weight of polyethylene glycol having an average molecular weight of 1,000,000 was added to 297 parts by weight of tetrahydrofuran (THF). The resulting mixture was stirred under heating to 50° C. to prepare the corresponding solution. To the resulting solution were added 2 parts by weight of "Sila-Ace S310", "S320", and "MS3301" (each, trade name; product of Chisso Corporation) having both an amino group and an alkoxysilane residue, followed by stirring to yield hydrophilic film forming coatings (G), (H) and (I), respectively.

(2) Chemical Hydrophilic Treatment of Anode Endplate Integrated with Current Collector The current collector portions of the anode endplates integrated with current collector were masked with a masking tape and subjected to UV/ozone treatment by exposing them to a low pressure mercury lamp under conditions of lamp intensity of 55 mW and exposure time of 1 minute. Then, the resulting plates were immersed in the above-described hydrophilic film forming coatings (A) to (I), respectively, for 30 seconds. After they were taken out from the coatings, they were heated at 110° C. for about 30 seconds to form a hydrophilic film on the surface of the anode endplate.

(3) Measurement of Contact Angle

The anode endplates integrated with current collector manufactured in (2) were immersed in a 20 wt. % aqueous methanol solution contained in a Teflon (trade mark) vessel and the vessel was put in a SUS pressure container. The pressure container was allowed to stand in a thermostat bath of 60° C. The anode endplates integrated with current collector were taken out after 2 days, 15 days and 60 days, respectively and wiped gently with "Kimwipe". The contact angle with water was then measured using a contact angle meter "CA-D" (trade name) manufactured by Kyowa Interface Science. As a result, as illustrated in Tables 13 and 14, the plates had a contact angle of 20° or less, exhibited high hydrophilicity and was stable even if they were immersed in a 20 wt. % aqueous methanol solution of 60° C. for long hours.

TABLE 13

|  |  | Comp. Ex. | Example 6 | | | |
|---|---|---|---|---|---|---|
|  |  | No treatment | (A) | (B) | (C) | (D) |
| Initial stage | Contact angle | 81 | <20 | <20 | <20 | <20 |
|  | Foam discharging performance | C | A | A | A | A |
|  | Internal pressure (kPa) | 50-55 | 21-23 | 21-23 | 21-23 | 21-23 |
|  | Output voltage (V) |  | 1.7-2.1 | 1.7-2.1 | 1.7-2.1 | 1.7-2.1 |
| Treatment with 20 wt. % aqueous methanol solution of 60° C. for 2 days | Contact angle | 85 | <20 | <20 | <20 | <20 |
|  | Foam discharging performance | C | A | A | A | A |
|  | Internal pressure (kPa) | 55-60 | 21-23 | 21-23 | 21-23 | 21-23 |
|  | Output voltage (V) |  | 1.7-2.1 | 1.7-2.1 | 1.7-2.1 | 1.7-2.1 |
| Treatment with 20 wt. % aqueous methanol solution of 60° C. for 15 days | Contact angle |  | <20 | <20 | <20 | <20 |
|  | Foam discharging performance |  | A | A | A | A |
|  | Internal pressure (kPa) |  | 21-23 | 21-23 | 21-23 | 21-23 |
|  | Output voltage (V) |  | 1.7-2.1 | 1.7-2.1 | 1.7-2.1 | 1.7-2.1 |
| Treatment with 20 wt. % aqueous methanol solution of 60° C. for 60 days | Contact angle |  | <20 | <20 | <20 | <20 |
|  | Foam discharging performance |  | A | A | A | A |
|  | Internal pressure (kPa) |  | 21-23 | 21-23 | 21-23 | 21-23 |
|  | Output voltage (V) |  | 1.7-2.1 | 1.7-2.1 | 1.7-2.1 | 1.7-2.1 |

TABLE 14

|  |  | Example 6 | | | | |
|---|---|---|---|---|---|---|
|  |  | (E) | (F) | (G) | (H) | (I) |
| Initial stage | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 2 days | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 15 days | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 60 days | Contact angle | <20 | <20 | <20 | <20 | <20 |
|  | Foam discharging performance | A | A | A | A | A |
|  | Internal pressure (kPa) | 21-23 | 21-23 | 21-23 | 21-23 | 21-23 |
|  | Output voltage (V) | 1.7-2.1 | 1.7-2.1 | 1.7-2.1 | 1.7-2.1 | 1.7-2.1 |

(4) Measurement of Foam Discharging Performance, Internal Pressure and Output Voltage of Fuel Cell (DMFC) Power Source System A fuel cell power source system as illustrated in FIG. 1 was manufactured using the anode endplate integrated with current collector. A cartridge filled with a 20 wt. % aqueous methanol solution was attached to the system and the system was operated for about 30 minutes at a load current density of 50 mA/cm². At the time, the foam discharging performance from the fuel tank in the fuel cell was visually observed, and the pressure in the fuel tank and output voltage were measured. The results are shown in Tables 13 and 14.

The fuel cell power source system using the anode endplate integrated with current collector showed good foam discharging performance and did not, show an increase in internal pressure and had an output voltage of 1.7V or greater both in the initial stage and 60 days after immersion in a 20 wt. % aqueous methanol solution.

The above-described finding suggests that application of a reactive hydrophilic coating onto the surface of an anode endplate integrated with current collector enables prompt discharge of a gas such as carbon dioxide gas generated at an anode electrode portion, prevention of an increase in internal pressure and stable supply of high output voltage for a long period of time.

Example 7

(1) Preparation of Hydrophilic Film Forming Coating

A 0.01 wt. % ethanol solution of polyoxyalkylene glycol, a 0.05 wt. % ethanol solution of polyoxyethylene alkylphenyl ether, a 0.05 wt. % ethanol solution of 3-heptyl cellosolve phenol, a 0.05 wt. % ethanol solution of diethylene glycol monooleate, a 0.1 wt. % ethanol solution of ethylene glycol distearate, a 0.05 wt. % ethanol solution of γ-glycidoxypropyltrimethoxysilane, a 0.05 wt. % ethanol solution of epoxyaminosilane, a 0.05 wt. % ethanol solution of aminoalkoxysilane, and a 0.005 wt. % ethanol solution of tetra (2,2-diallyloxymethyl-1-butyl)bis(ditridecyl)phosphite titanate were prepared as hydrophilic film forming coatings (A) to (I), respectively.

(2) Chemical Hydrophilic Treatment of Anode Endplate Integrated with Current Collector The current collector portions of the anode endplates integrated with current collector were masked with a masking tape and they were subjected to corona discharge treatment. Then, the resulting plates were immersed in the above-described hydrophilic film forming coatings (A) to (I), respectively, for 30 seconds. After they were taken out from the coatings, they were heated to 110° C. for about 30 seconds to form hydrophilic films on the surface of the anode endplates.

(3) Measurement of Contact Angle

The anode endplates integrated with current collector manufactured in (1) were immersed in a 20 wt. % aqueous methanol solution contained in a Teflon (trade mark) vessel and the vessel was put in a SUS pressure container. The pressure container was allowed to stand in a thermostat bath of 60° C. The samples were taken out after 2 days, 15 days and 60 days, respectively and wiped gently with "Kimwipe". The contact angle with water was then measured using a contact angle meter "CA-D" (trade name) manufactured by Kyowa Interface Science. As a result, as illustrated in Tables 15 and 16, any of the plates had a contact angle of 20° or less and exhibited high hydrophilic property in the initial stage. Immersion in a 20 wt. % aqueous methanol solution of 60° C. for long hours gradually increased the contact angles of the anode endplates (A) to (E). Fuel power source systems having, incorporated therein, the anode endplates (F) to (I) to which hydrophilic agents reactive with the surface of the anode endplates were applied had a contact angle of 20° or less, thus showing super hydrophilic property even after immersion in a 20 wt. % aqueous methanol solution of 60° C. for long hours.

TABLE 15

| | | | Example 7 | | | |
|---|---|---|---|---|---|---|
| | | Comp. Ex. No treatment | (A) Polyoxyalkylene glycol: 0.01 wt. % | (B) Polyoxyethylene alkylphenyl ether: 0.05 wt. % | (C) 3-Heptyl cellosolve phenol: 0.05 wt. % | (D) Diethylene glycol monooleate: 0.05 wt. % |
| Initial stage | Contact angle | 81 | <20 | <20 | <20 | <20 |
| | Foam discharging performance | C | A | A | A | A |
| | Internal pressure (kPa) | 50-55 | 21-23 | 31-35 | 21-23 | 21-23 |
| | Output voltage (V) | | 1.7-2.1 | 1.7-2.1 | 1.7-2.1 | 1.7-2.1 |
| Treatment with 20 wt. % aqueous methanol solution of 60° C. for 2 days | Contact angle | 85 | 21-23 | 21-25 | 23-28 | 21-23 |
| | Foam discharging performance | C | A-B | A-B | A-B | A-B |
| | Internal pressure (kPa) | 55-60 | 25-30 | 25-40 | 25-30 | 25-30 |
| | Output voltage (V) | | 0.8-1.7 | 0.8-1.7 | 0.8-1.7 | 0.8-1.7 |
| Treatment with 20 wt. % aqueous methanol solution of 60° C. for 15 days | Contact angle | | 21-23 | 25-32 | 21-23 | 21-23 |
| | Foam discharging performance | | B-C | B-C | B-C | B-C |
| | Internal pressure (kPa) | | 20-60 | 20-60 | 20-60 | 20-60 |
| | Output voltage (V) | | 0.16-0.85 | 0.18-0.90 | 0.16-0.85 | 0.16-0.85 |
| Treatment with 20 wt. % aqueous methanol solution of 60° C. for 60 days | Contact angle | | 28-45 | 28-40 | 28-45 | 28-45 |
| | Foam discharging performance | | B-C | B-C | B-C | B-C |
| | Internal pressure (kPa) | | 20-60 | 20-60 | 20-60 | 20-60 |
| | Output voltage (V) | | 0.16-0.85 | 0.16-0.95 | 0.14-0.93 | 0.16-0.85 |

Table 16

| | | Example 7 | | | | |
|---|---|---|---|---|---|---|
| | | (E) Ethylene glycol distearate: 0.1 wt. % | (F) Dimethoxy-aminosilane: 0.05 wt. % | (G) γ-Glycidoxy-dipropyltrimethoxy-silane: 0.05 wt. % | (H) Aminoalkoxy-silane: 0.05 wt. % | (I) Tetra(2,2-diallyloxymethyl-1-butyl)bis(ditridecyl)phosphite titanate: 0.005 wt. % |
| Initial stage | Contact angle | <20 | <20 | <20 | <20 | <20 |
| | Foam discharging performance | A | A | A | A | A |
| | Internal pressure (kPa) | 21-23 | 21-23 | 21-23 | 21-23 | 21-23 |
| | Output voltage (V) | 1.7-2.1 | 1.7-2.1 | 1.7-2.1 | 1.7-2.1 | 1.7-2.1 |
| Treatment with 20 wt. % aqueous methanol solution of 60° C. for 2 days | Contact angle | 21-23 | <20 | <20 | <20 | <20 |
| | Foam discharging performance | A-B | A | A | A | A |
| | Internal pressure (kPa) | 25-30 | 21-23 | 21-23 | 21-23 | 21-23 |
| | Output voltage (V) | 0.8-1.7 | 1.7-2.1 | 1.7-2.1 | 1.7-2.1 | 1.7-2.1 |
| Treatment with 20 wt. % aqueous methanol solution of 60° C. for 15 days | Contact angle | 21-23 | <20 | <20 | <20 | <20 |
| | Foam discharging performance | B-C | A | A | A | A |
| | Internal pressure (kPa) | 20-60 | 21-23 | 21-23 | 21 23 | 21-23 |
| | Output voltage (V) | 0.16-0.85 | 1.7-2.1 | 1.7-2.1 | 1.7-2.1 | 1.7-2.1 |
| Treatment with 20 wt. % aqueous methanol solution of 60° C.for 60 days | Contact angle | 28-45 | <20 | <20 | <20 | <20 |
| | Foam discharging performance | B-C | A | A | A | A |
| | Internal pressure (kPa) | 20-60 | 21-23 | 21-23 | 21-23 | 21-23 |
| | Output voltage (V) | 0.16-0.85 | 1.7-2.1 | 1.7-2.1 | 1.7-2.1 | 1.7-2.1 |

(4) Measurement of Foam Discharging Performance, Internal Pressure and Output Voltage of Fuel Cell (DMFC) Power Source System A fuel cell power source system as illustrated in FIG. 1 was manufactured using the above-described anode endplate integrated with current collector. A cartridge filled with a 20 wt. % aqueous methanol solution was attached to the system and the system was operated for about 30 minutes at a load current density of 50 mA/cm$^2$. At the time, the foam discharging performance from the fuel tank in the fuel cell was visually observed, and the pressure in the fuel tank and output voltage were measured. The results are shown in Tables 15 and 16.

The fuel cell power source system using the anode endplate integrated with current collector in the initial stage showed good foam discharging performance, did not show an increase in internal pressure and exhibited stable output voltage of 1.7V or greater. It has been found that the fuel cell power source systems having the anode endplates (A) to (E) incorporated therein tended to become hydrophobic gradually, have deteriorated foam discharging performance, have increased internal pressure and have less uniform output voltage when immersed in a 20 wt. % aqueous methanol solution of 60° C. The fuel cell power source systems having incorporated therein the anode endplates (F) to (I) treated with a reactive hydrophilic film forming coating showed good foam discharging performance, did not show an increase in internal pressure and had stable output voltage of 1.7V or greater even when immersed in a 20 wt. % aqueous methanol solution of 60° C.

The above-described finding suggests that application of a hydrophilic coating (especially, reactive) onto the surface of an anode endplate integrated with current collector enables prompt discharge of a gas such as carbon dioxide gas generated at an anode electrode portion, prevention of an increase in internal pressure and stable supply of high output voltage for a long period of time.

As is apparent from Examples so far described, in a fuel cell which comprises a membrane electrode assembly for producing power by oxidizing fuel at an anode electrode and reducing oxygen at a cathode electrode, an anode diffusion layer for transmitting fuel and transferring electrons produced by oxidation to the outside of the anode electrode of the membrane electrode assembly, a cathode diffusion layer for removing water thus generated and transferring electrons to be used for the reduction to the outside of the cathode electrode, an anode current collector and an anode endplate for transferring electrons generated by the oxidation outside the anode diffusion layer, and a cathode current collector and cathode endplate for transferring electrons to be used for the reduction outside the cathode diffusion layer, the following methods are employed either singly or in combination of two or more:

(i) to make the anode diffusion layer non-water repellent.

(ii) to make the anode diffusion layer hydrophilic.

(iii) to adjust a short side/long side ratio of the slits of the anode current collectors and anode end plates to from 0.2 to 0.95.

(iv) to incline the slits of the anode endplate and current collector so that they become wider from the anode diffusion layer side toward the air layer side.

(v) to roughen the surface of an anode endplate by physical means such as sandblast.

(vi) to hydrophilize an anode endplate, especially with a reactive hydrophilizing agent.

By the above-described methods, it is possible to prevent a gas such as carbon dioxide or carbon monoxide generated at an anode from adsorbing to an anode diffusion layer or endplate, carry out discharge of the gas from the anode diffusion layer smoothly to prevent an increase in internal pressure and supply a high output voltage stably for a prolonged period of time.

Use of the fuel cell power source system of the present invention as a battery charger attached to personal digital assistance such as mobile phone having a built-in secondary battery, mobile personal computer, mobile audio, digital camera or visual devices or use of it as a built-in power source directly without using a second battery makes it possible to prolong the operation time of these electronic devices and use them continuously by supply of fuel.

What is claimed is:

1. A fuel cell having a membrane electrode assembly for generating power by oxidizing fuel at an anode electrode and reducing oxygen at a cathode electrode a fuel chamber, an anode diffusion layer for allowing fuel to pass therethrough from the fuel chamber toward the outside of the anode electrode of the membrane electrode assembly and transferring electrons generated by the oxidation, a cathode diffusion layer for removing water thus generated and transferring electrons to be used for the reduction to the outside of the cathode electrode, an anode current collector and an anode endplate for transferring electrons generated by the oxidation to the outside of the anode diffusion layer, and a cathode current collector and a cathode endplate for transferring electrons to be used for the reduction to the outside of the cathode diffusion layer, wherein the anode endplate is hydrophilic and has slits for promoting discharge of a gas generated by the reaction, wherein the slits have inclined structures such that their widths widen from a side adjacent the anode diffusion layer toward a side adjacent the fuel chamber, and wherein the anode diffusion layer is hydrophilic.

2. The fuel cell according to claim 1, wherein the anode diffusion layer has been subjected to hydrophilization treatment.

3. The fuel cell according to claim 1, wherein the anode current collector has slits, each having a ratio of a length of a short side to a length of a long side of from 0.5 to 0.92.

4. The fuel cell according to claim 1, wherein the anode endplate has been subjected to chemical or physical hydrophilization treatment.

5. The fuel cell according to claim 4, wherein the anode endplate has been subjected to chemical treatment with a hydrophilizing agent.

6. The fuel cell according to claim 4, wherein the anode endplate has been subjected to chemical treatment means treatment with UV/ozone, excimer laser or oxygen plasma.

7. The fuel cell according to claim 6 wherein the anode endplate has been subjected to chemical treatment with UV/ozone, excimer laser or oxygen plasma, then with a hydrophilizing agent.

8. The fuel cell according to claim 1, wherein the anode endplate has been physically roughened.

9. The fuel cell according to claim 8, wherein the physical roughening treatment is sandblasting.

10. A fuel cell power source system comprising the fuel cell as claimed in claim 1 and a power source control portion and a DC-DC converter attached thereto.

11. An electronic device comprising the fuel cell power source system as claimed in claim 10 attached thereto.

12. An electronic device according to claim 10, which is any one of a personal digital assistance, notebook mobile personal computer, mobile phone and camcorder.

13. The electronic device according to claim 10, which is an outdoor portable power source.

14. The fuel cell according to claim 1, wherein the cathode current collector side is constituted to come into contact with the air.

15. The fuel cell according to claim 1, wherein the cathode endplate surrounds the cathode current collector, wherein the cathode diffusion layer is brought into contact with air via slits on the side of the cathode current collector, methanol fuel is brought into contact with the anode diffusion layer via slits on the side of the anode current collector, and the anode endplate surrounds the anode current collector.

* * * * *